United States Patent
Kokubun

(10) Patent No.: US 12,549,853 B2
(45) Date of Patent: Feb. 10, 2026

(54) AUTOMATIC FOCUS CONTROL DEVICE, OPERATION METHOD OF AUTOMATIC FOCUS CONTROL DEVICE, OPERATION PROGRAM OF AUTOMATIC FOCUS CONTROL DEVICE, AND IMAGING APPARATUS

(71) Applicant: FUJIFILM Corporation, Tokyo (JP)

(72) Inventor: Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 40 days.

(21) Appl. No.: 18/611,747

(22) Filed: Mar. 21, 2024

(65) Prior Publication Data

US 2024/0334052 A1    Oct. 3, 2024

(30) Foreign Application Priority Data

Mar. 28, 2023 (JP) .................. 2023-051549

(51) Int. Cl.
*H04N 23/67* (2023.01)
*H04N 23/611* (2023.01)
*H04N 23/63* (2023.01)
*H04N 23/68* (2023.01)

(52) U.S. Cl.
CPC ......... *H04N 23/675* (2023.01); *H04N 23/611* (2023.01); *H04N 23/672* (2023.01); *H04N 23/684* (2023.01); *H04N 23/635* (2023.01)

(58) Field of Classification Search
CPC ............... H04N 23/675; H04N 23/611; H04N 23/672; H04N 23/684; H04N 23/80; H04N 23/635

USPC ........................................ 348/222.1
See application file for complete search history.

(56) References Cited

U.S. PATENT DOCUMENTS

| | | | | |
|---|---|---|---|---|
| 10,326,924 | B2* | 6/2019 | Takao | G03B 13/36 |
| 10,694,127 | B2* | 6/2020 | Tamaki | H04N 25/704 |
| 11,048,063 | B2* | 6/2021 | Ishii | H04N 25/77 |
| 2015/0215545 | A1* | 7/2015 | Hayashi | G02B 7/28 |
| | | | | 348/333.05 |
| 2016/0198110 | A1* | 7/2016 | Ikedo | H04N 25/767 |
| | | | | 348/222.1 |
| 2017/0374271 | A1* | 12/2017 | Takao | H04N 23/672 |
| 2018/0063399 | A1* | 3/2018 | Matsuyama | H04N 23/672 |
| 2018/0239108 | A1* | 8/2018 | Ishii | H04N 25/703 |
| 2018/0376086 | A1* | 12/2018 | Tamaki | H04N 23/63 |
| 2020/0041759 | A1* | 2/2020 | Ishii | H04N 25/703 |
| 2020/0077032 | A1* | 3/2020 | Hamano | H04N 23/64 |

(Continued)

FOREIGN PATENT DOCUMENTS

JP    2004023747    1/2004

*Primary Examiner* — Pritham D Prabhakher
(74) *Attorney, Agent, or Firm* — JCIPRNET

(57) ABSTRACT

A CPU of a controller of an imaging apparatus includes an imaging controller, a detection unit, and a focus adjustment unit. The imaging controller controls a readout operation of an image signal from an imaging element. The detection unit detects a target region of automatic focus control. The focus adjustment unit performs the automatic focus control based on the target region. In the readout operation, the imaging controller first thins out and reads out a signal for detection which is an image signal for detecting the target region, and reads out a residual image signal after an end of the thinning out and reading out.

20 Claims, 22 Drawing Sheets

(56) References Cited

U.S. PATENT DOCUMENTS

| | | | |
|---|---|---|---|
| 2023/0037107 A1* | 2/2023 | Ishii | H04N 23/675 |
| 2023/0269497 A1* | 8/2023 | Kawai | H04N 25/533 |
| | | | 348/297 |

* cited by examiner

AUTOMATIC FOCUS CONTROL DEVICE, OPERATION METHOD OF AUTOMATIC FOCUS CONTROL DEVICE, OPERATION PROGRAM OF AUTOMATIC FOCUS CONTROL DEVICE, AND IMAGING APPARATUS

CROSS-REFERENCE TO RELATED APPLICATIONS

The present application claims priority under 35 U.S.C. § 119 to Japanese Patent Application No., 2023-051549 filed on Mar. 28, 2023. The above application is hereby expressly incorporated by reference, in its entirety, into the present application.

BACKGROUND

1. Technical Field

The technique of the present disclosure relates to an automatic focus control device, an operation method of an automatic focus control device, an operation program of an automatic focus control device, and an imaging apparatus.

2. Description of the Related Art

JP2004-023747A discloses an electronic camera comprising an imaging element that converts a subject image into an image signal by photoelectric conversion, a display unit having a display region in which an image based on the image signal is displayed, and a focusing control unit that performs autofocus control based on the image signal. The imaging element has, as a readout mode of the image signal, a first mode in which image signals corresponding to a predetermined number of pixels among all pixels in the imaging element are read out and a second mode in which image signals corresponding to a number of pixels smaller than the predetermined number of pixels among all the pixels therein are read out to read out a plurality of images at high speed. The focusing control unit performs the autofocus control based on the image signal read out in the second mode. The display unit updates and displays, in a case where the autofocus control is performed, a composite image of a first image based on the image signal read out in the first mode before the readout mode transitions to the second mode and a second image based on the image signal read out in the second mode.

SUMMARY

One embodiment according to the technique of the present disclosure provides an automatic focus control device, an operation method of an automatic focus control device, an operation program of an automatic focus control device, and an imaging apparatus capable of suppressing, in a case where an image of a target region of automatic focus control is displayed, a display deviation of the image of the target region caused by movement of a subject.

An automatic focus control device according to an aspect of the present disclosure comprises a processor. The processor is configured to control a readout operation of an image signal from an imaging element, detect a target region of automatic focus control, perform the automatic focus control based on the target region, and in the readout operation, first thin out and read out a signal for detection which is an image signal for detecting the target region, and read out a remaining image signal after an end of the thinning out and reading out.

It is preferable that the processor is configured to perform the automatic focus control using the signal for detection.

It is preferable that the imaging element has a phase difference detection pixel for detecting a phase difference of subject light, and the processor is configured to perform the automatic focus control using a signal for calculation output from the phase difference detection pixel.

It is preferable that the processor is configured to detect the target region from the signal for detection using a machine learning model subjected to learning with an image output from an imaging element having a phase difference detection pixel.

An operation method of an automatic focus control device according to the present disclosure comprises controlling a readout operation of an image signal from an imaging element, detecting a target region of automatic focus control, performing the automatic focus control based on the target region, and in the readout operation, first thinning out and reading out a signal for detection which is an image signal for detecting the target region, and reading out a remaining image signal after an end of the thinning out and reading out.

An operation program of an automatic focus control device according to the present disclosure comprises controlling a readout operation of an image signal from an imaging element, detecting a target region of automatic focus control, performing the automatic focus control based on the target region, and in the readout operation, first thinning out and reading out a signal for detection which is an image signal for detecting the target region, and reading out a remaining image signal after an end of the thinning out and reading out.

An imaging apparatus according to the present disclosure comprises an imaging element, an imaging controller that controls a readout operation of an image signal from the imaging element, a detection unit that detects a target region of automatic focus control, a focus adjustment unit that performs the automatic focus control based on the target region, an image generation unit that generates an image of the target region from the image signal, and a display controller that performs control of displaying the image of the target region on a display unit. The imaging controller first thins out and reads out, in the readout operation, a signal for detection which is an image signal for detecting the target region by the detection unit, and reads out a remaining image signal after an end of the thinning out and reading out.

It is preferable that the display controller performs control of displaying the image of the target region on the display unit after the end of the thinning out and reading out and before an end of the reading out of the remaining image signal.

It is preferable that the image generation unit generates an entire image of a subject from the image signal, and the display controller performs control of displaying the image of the target region and the entire image together on the display unit while updating the display.

It is preferable that the imaging controller performs the thinning out and reading out while a live view image is displayed.

It is preferable that the image generation unit generates at least the image of the target region from the remaining image signal.

It is preferable that the imaging controller performs the thinning out and reading out while a video is captured.

It is preferable that the image generation unit generates at least the entire image from the remaining image signal.

It is preferable that the display controller synchronizes display update timings of the image of the target region and the entire image.

It is preferable that the display controller starts or updates the display of the image of the target region as soon as the detection unit detects the target region using the signal for detection, without waiting for a display update timing of the entire image.

It is preferable that the display controller sets a time lag from an end of the detection of the target region in the detection unit to the start or update of the display of the image of the target region to be equal to or less than a certain period.

It is preferable that a continuous capturing mode in which a static image is continuously captured at a preset capturing interval is included, the imaging controller thins out and reads out the signal for detection at a beginning of a readout operation of an image signal of the static image captured in the continuous capturing mode, and reads out a remaining image signal of the static image after an end of the thinning out and reading out, the image generation unit generates the image of the target region from the image signal of the static image, and the display controller performs, in a period where two consecutive static images are captured, control of updating the display of the entire image and displaying the image of the target region on the display unit together with the entire image without updating only an image generated from the image signal of the static image.

It is preferable that the focus adjustment unit performs the automatic focus control using the signal for detection.

It is preferable that the imaging element has a phase difference detection pixel for detecting a phase difference of subject light, and the focus adjustment unit performs the automatic focus control using a signal for calculation output from the phase difference detection pixel.

It is preferable that the detection unit detects the target region from the signal for detection by using a machine learning model subjected to learning with an image output from an imaging element having a phase difference detection pixel.

BRIEF DESCRIPTION OF THE DRAWINGS

Exemplary embodiments according to the technique of the present disclosure will be described in detail based on the following figures, wherein.

DETAILED DESCRIPTION

First Embodiment

Figure 1:
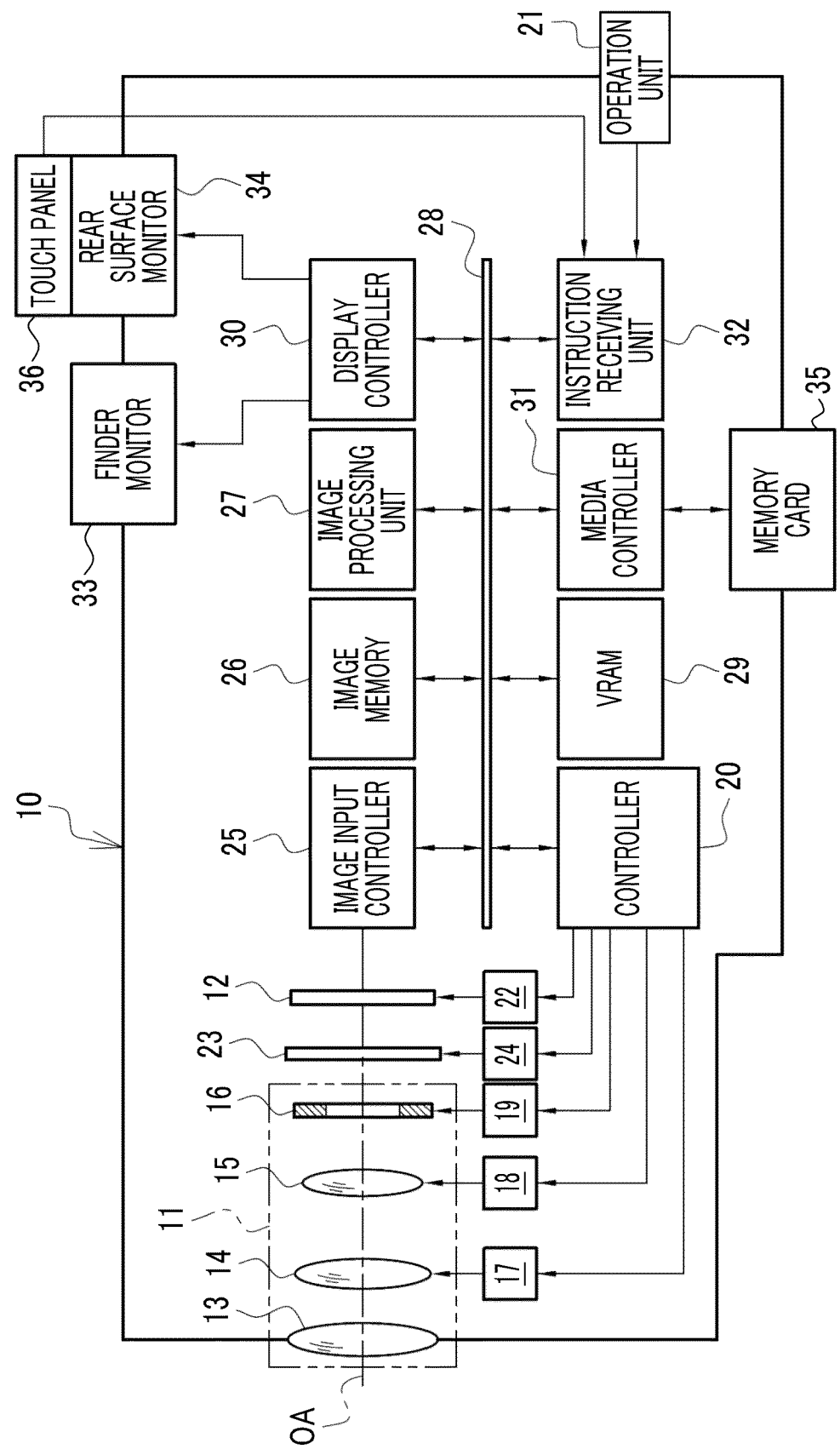
FIG. 1 is a diagram showing a configuration of an imaging apparatus.

As shown in FIG. 1 as an example, an imaging apparatus 10 is, for example, a mirrorless single-lens digital camera, and comprises an imaging optical system 11 and an imaging element 12. The imaging optical system 11 has a plurality of types of lenses for forming an image of subject light on the imaging element 12. Specifically, the imaging optical system 11 has an objective lens 13, a focus lens 14, and a zoom lens 15. Each of these lenses 13 to 15 is disposed in this order from an object side (subject side) toward an image formation side (imaging element 12 side). Although simplified in FIG. 1, each of the lenses 13 to 15 is actually a lens group in which a plurality of lenses are combined. The imaging optical system 11 also has a stop 16. The stop 16 is disposed closest to the image formation side in the imaging optical system 11. The imaging apparatus 10 may be a type in which a lens barrel with built-in the imaging optical system 11 and the like is integrated with a main body with built-in the imaging element 12 and the like, or may be a so-called lens interchangeable type in which the lens barrel and the main body are separate bodies.

The focus lens 14 is provided with a focus lens driving mechanism 17, the zoom lens 15 is provided with a zoom lens driving mechanism 18, and the stop 16 is provided with a stop driving mechanism 19. The focus lens driving mechanism 17 holds the focus lens 14, and includes a cam ring for focusing in which a cam groove is formed on the outer periphery of the focus lens 14, a motor for focusing that rotates the cam ring for focusing around an optical axis OA to move the cam ring for focusing along the optical axis OA, a driver of the motor for focusing, and the like. Similarly, the zoom lens driving mechanism 18 holds the zoom lens 15, and includes a cam ring for zoom in which a cam groove is formed on the outer periphery of the zoom lens 15, a motor for zoom that rotates the cam ring for zoom around the optical axis OA to move the cam ring for zoom along the optical axis OA, a driver of the motor for zoom, and the like. The stop driving mechanism 19 includes a motor for stop that opens and closes a plurality of stop leaf blades of the stop 16, a driver of the motor for stop, and the like.

The motor for focusing, the motor for zoom, and the motor for stop are, for example, stepping motors. In this case, positions of the focus lens 14 and the zoom lens 15 on the optical axis OA and an opening degree of the stop 16 can be derived from drive amounts of the motor for focusing, the motor for zoom, and the motor for stop. A position sensor may be provided to detect the positions of the focus lens 14 and the zoom lens 15, instead of the drive amounts of the motor for focusing and the motor for zoom.

An electric component, such as the motor or the driver, of each of the driving mechanisms 17 to 19 is connected to a controller 20. The electric component of each of the driving mechanisms 17 to 19 is driven under the control of the controller 20. More specifically, the controller 20 issues a drive signal in response to an instruction from a user, which is input via an operation unit 21, to drive the electric component of each of the driving mechanisms 17 to 19. For example, in a case where an instruction to change an angle of view to a telephoto side is input via an angle-of-view change switch of the operation unit 21, the controller 20 issues, to the driver of the motor for zoom of the zoom lens driving mechanism 18, the drive signal to move the zoom lens 15 to the telephoto side.

The motor for focusing, the motor for zoom, and the motor for stop output the drive amounts to the controller 20. The controller 20 derives, from the drive amounts, the positions of the focus lens 14 and the zoom lens 15 on the optical axis OA and the opening degree of the stop 16.

The imaging element 12 is, for example, a complementary metal-oxide-semiconductor (CMOS) image sensor, and has an imaging surface 42 (refer to FIG. 2) that images the subject light. The imaging element 12 is disposed such that a center of the imaging surface 42 matches the optical axis OA and the imaging surface 42 is orthogonal to the optical axis OA. The terms "match" and "orthogonal" as used herein mean not only perfect match and orthogonality but also match and orthogonality in a sense including an error generally allowed in the technical field to which the technique of the present disclosure belongs.

An imaging element driver 22 is connected to the imaging element 12. The imaging element driver 22 is connected to the controller 20. The imaging element driver 22 performs, under the control of the controller 20, supplying of a vertical scanning signal and a horizontal scanning signal to the imaging element 12, or the like to control an imaging timing of the subject light by the imaging element 12.

A shutter 23 is provided between the imaging optical system 11 and the imaging element 12. The shutter 23 is, for example, a focal-plane shutter having a front curtain and a rear curtain. A shutter driving mechanism 24 is connected to the shutter 23. The shutter driving mechanism 24 includes an electromagnet that holds the front curtain and the rear curtain and releases the holding thereof to cause the front curtain and the rear curtain to travel, a driver of the electromagnet, and the like. The shutter driving mechanism 24 is driven to open and close the shutter 23 under the control of the controller 20.

The controller 20 is connected to each unit such as an image input controller 25, an image memory 26, and an image processing unit 27, through a busline 28. In addition, the busline 28 is connected to a video random access memory (VRAM) 29, a display controller 30, a media controller 31, an instruction receiving unit 32, and the like. Although not shown, the busline 28 is also connected to a strobe driving controller that controls the drive of a strobe device, an external communication interface (I/F) for communicating with an external device via a connection terminal such as a universal serial bus (USB) terminal or a wireless communication I/F, and the like.

Image data obtained by imaging the subject light is input to the image input controller 25 from the imaging element 12. The image input controller 25 outputs the image data to the image memory 26. The image memory 26 is, for example, a synchronous dynamic random access memory (SDRAM), and temporarily stores the image data.

The image processing unit 27 reads out unprocessed image data from the image memory 26. The image processing unit 27 performs various types of image processing on the image data. The various types of image processing are, for example, offset correction processing, sensitivity correction processing, pixel interpolation processing, white balance correction processing, gamma correction processing, demosaicing, brightness signal and color difference signal generation processing, contour enhancement processing, and color correction processing. The image processing unit 27 writes the image data subjected to the various types of image processing back to the image memory 26. The image processing unit 27 is an example of "image generation unit" according to the technique of the present disclosure.

The image data that is subjected to the various types of image processing and is displayed as a live view image (also referred to as through-image) is input into the VRAM 29 from the image memory 26. The VRAM 29 has a region in which the image data for two consecutive frames is stored. The image data stored in the VRAM 29 is sequentially rewritten to new image data. The VRAM 29 sequentially outputs, to the display controller 30, newer image data of the image data for two consecutive frames.

The display controller 30 has a so-called video encoder function of converting the image data from the VRAM 29 into video data and outputting the video data to any one of a finder monitor 33 or a rear surface monitor 34. Accordingly, the user can visually recognize the live view image through any one of the finder monitor 33 or the rear surface monitor 34. A display frame rate of the live view image is, for example, 60 frames per second (fps). The finder monitor 33 and the rear surface monitor 34 are examples of "display unit" according to the technique of the present disclosure. Hereinafter, the finder monitor 33 and the rear surface monitor 34 may be collectively denoted as a display unit.

Which one of the finder monitor 33 and the rear surface monitor 34 the video data is output to is decided as follows, for example. That is, a pupil detection sensor is provided in a finder. In a case where the pupil detection sensor detects that the user looks into the finder, the video data is output to the finder monitor 33. On the contrary, in a case where the pupil detection sensor detects that the user does not look into the finder, the video data is output to the rear surface monitor 34.

In a case where an instruction to start capturing a static image or a video is issued via a fully push-operated release button of the operation unit 21, the image processing unit 27 performs compression processing on the image data of the image memory 26. In a case of the static image, the image processing unit 27 performs, for example, the compression processing of a joint photographic experts group (JPEG) format on the image data. In a case of the video, the image processing unit 27 performs, for example, the compression processing of a moving picture experts group (MPEG) format on the image data. The image processing unit 27 outputs, to the media controller 31, the image data subjected to the compression processing.

The media controller 31 records, in a memory card 35, the image data subjected to the compression processing from the image processing unit 27. The memory card 35 is attachably and detachably mounted in a memory card slot (not illustrated).

In a case where an image playback mode is selected via a mode selector switch of the operation unit 21, the media controller 31 reads out the image data from the memory card 35 to output the image data to the image processing unit 27. The image processing unit 27 performs expansion processing on image data from the memory card 35. The image data subjected to the expansion processing is output to the display controller 30. The display controller 30 converts the image data into the video data and outputs the video data to the rear surface monitor 34. Accordingly, the user can visually recognize a reproduction image through the rear surface monitor 34.

The instruction receiving unit 32 receives various operation instructions input from the user via a touch panel 36 that is integrally provided with the operation unit 21 and the rear surface monitor 34. The instruction receiving unit 32 outputs the received various operation instructions to the controller 20 through the busline 28.

As described above, the operation unit 21 includes the angle-of-view change switch, the release button, and the mode selector switch. The release button is a two-stage push button capable of performing a half push operation and a full push operation. An instruction to prepare capturing of a static image or a video is issued by a half push operation of the release button, and the instruction to start capturing a static image or a video is issued by the full push operation of the release button. In addition to the above, the operation unit 21 further includes a menu button for displaying various setting menus on the rear surface monitor 34, a cross key used for numerical value setting, switching of options, and the like, and a confirmation button that is operated in a case of setting confirmation and the like. The touch panel 36 is superimposed on a display surface of the rear surface monitor 34. The touch panel 36 detects contact with a finger of the user or a dedicated indicator such as a stylus pen to recognize the various operation instructions from the user.

The modes that can be switched by the mode selector switch include a static-image capturing mode, a video imaging mode, an image playback mode, a setting mode, and the like. The static-image capturing mode includes not only a normal capturing mode in which one static image is captured but also a continuous capturing mode in which static images are continuously captured at a predetermined capturing interval (for example, frame rate of 5 fps to 10 fps). The continuous capturing mode is activated, for example, in a case where a full push state of the release button continues for a predetermined time or longer (for example, one second or longer). The continuous capturing mode ends in a case where the full push state of the release button is released.

Figure 2:
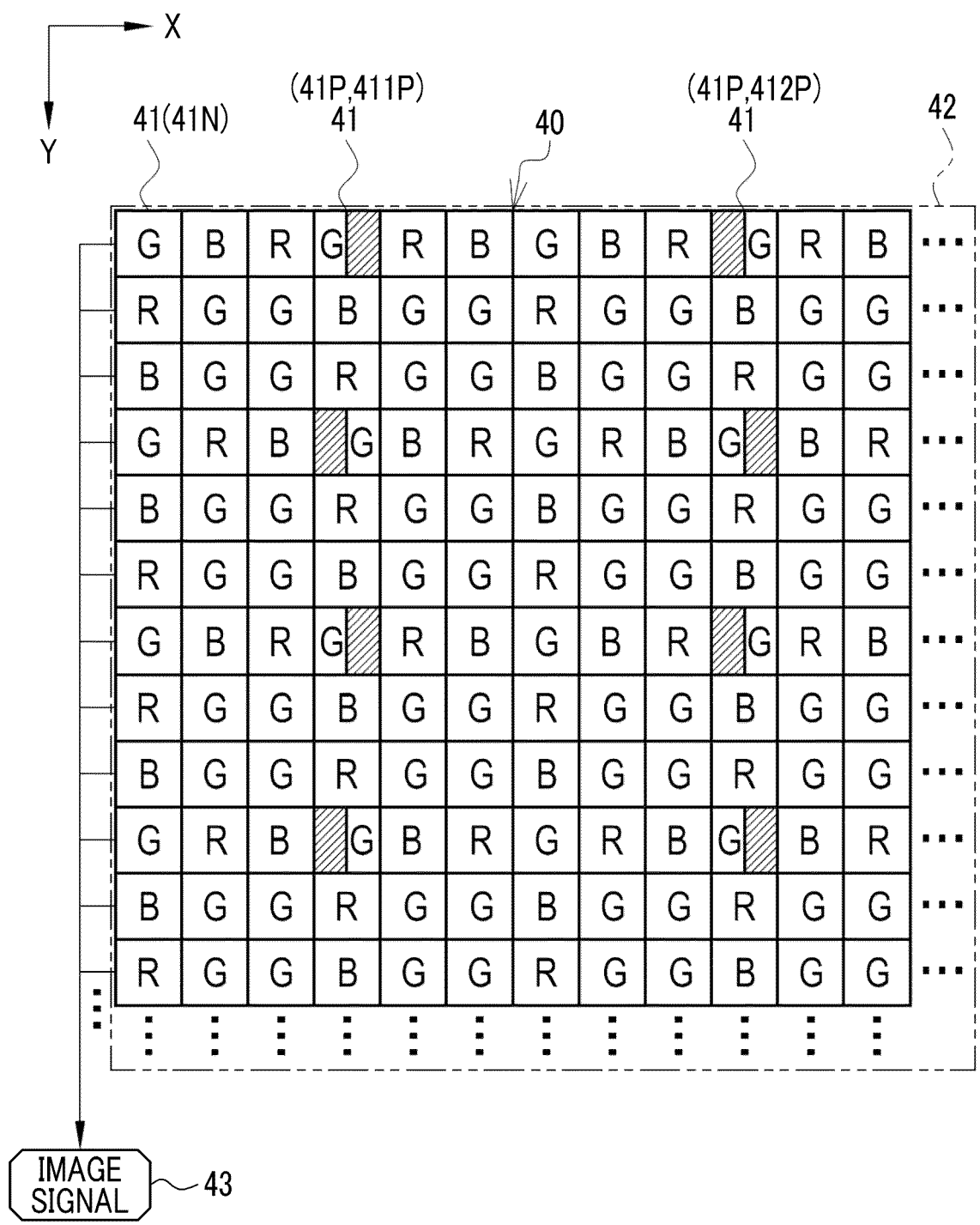
FIG. 2 is a diagram showing an arrangement of pixels of an imaging element.

As shown in FIG. 2 as an example, the imaging element 12 is provided with a photoelectric conversion unit 40. The photoelectric conversion unit 40 is configured of a plurality of pixels 41 two-dimensionally arranged along an X direction and a Y direction. The plurality of pixels 41 form the imaging surface 42. As is well known, the pixel 41 is configured of a micro lens 45, a color filter 46, and a photoelectric conversion element 47 such as a photodiode (refer to FIGS. 3 to 5 for all). The X direction and the Y direction are a horizontal direction and a vertical direction in a state where a bottom surface of the imaging apparatus 10 is placed on a horizontal plane.

Scanning lines parallel to the X direction are wired between rows of the pixels 41. Further, signal lines parallel to the Y direction are wired between columns of the pixels 41. (The photoelectric conversion element 47 of) the pixel 41 is connected to the signal line via an amplifier and a switch. The scanning line is also connected to the switch. In a case of the accumulation operation that accumulates a signal charge corresponding to the subject light in (the photoelectric conversion element 47 of) the pixel 41, an off signal is supplied as the vertical scanning signal through the scanning line to turn off the switch. In a case of the readout operation that reads out an image signal (voltage signal) 43 corresponding to the signal charge from (the photoelectric conversion element 47 of) the pixel 41, an on signal is supplied as the vertical scanning signal through the scanning line to turn on the switch. An end of the signal line is connected to a correlated double sampling (CDS) circuit and an analog to digital converter (ADC) circuit. The CDS circuit performs sampling two correlation pile on the image signal 43 input through the signal line. The ADC circuit converts the image signal 43 subjected to the sampling two correlation pile into a digital image signal 43.

The pixels 41 are divided, depending on types of the color filter 46, into three types of a green pixel (denoted as "G" in FIG. 2) having sensitivity to light in a green wavelength range, a red pixel (denoted as "R" in FIG. 2) having sensitivity to light in a red wavelength range, and a blue pixel (denoted as "B" in FIG. 2) having sensitivity to light in a blue wavelength range. The three types of the pixels 41 are regularly arranged in a predetermined array. As the predetermined array, a so-called Bayer array is exemplified in which two green pixels, one blue pixel, and one red pixel are arranged in vertical and horizontal 2×2 pixels.

The pixel 41 includes a normal pixel 41N and a phase difference detection pixel 41P. The phase difference detection pixel 41P further includes a first phase difference detection pixel 411P and a second phase difference detection pixel 412P. The normal pixel 41N has three types of pixels of the green pixel, the blue pixel, and the red pixel, but the phase difference detection pixel 41P has only the green pixel.

The phase difference detection pixels 41P are arranged at predetermined spacings in the X direction and the Y direction. In FIG. 2, the phase difference detection pixels 41P are arranged at a spacing of five pixels in the X direction and at a spacing of two pixels in the Y direction. Further, the phase difference detection pixels 41P are arranged such that the first phase difference detection pixels 411P and the second phase difference detection pixels 412P alternately appear in the X direction and the Y direction. For example, in a case where a fourth row is viewed, the phase difference detection pixels 41P are arranged in an order, from left to right, of the second phase difference detection pixel 412P, the first phase difference detection pixel 411P, and the like. Further, for example, in a case where a tenth column is viewed, the phase difference detection pixels 41P are arranged in an order, from top to bottom, of the second phase difference detection pixel 412P, the first phase difference detection pixel 411P, the second phase difference detection pixel 412P, the first phase difference detection pixel 411P, and the like. The first phase difference detection pixel 411P and the second phase difference detection pixel 412P adjacent to each other in the X direction and the Y direction configure one set for detecting a phase difference a (refer to FIG. 6).

Figure 3:
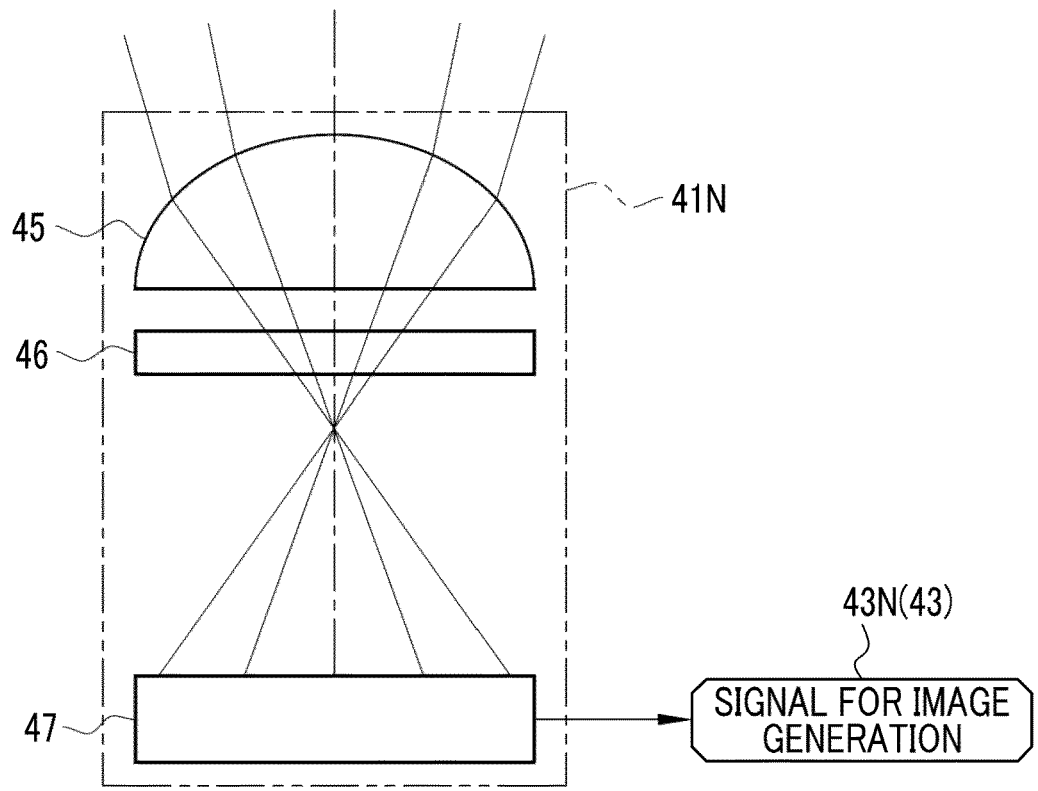
FIG. 3 is a diagram showing a configuration of a normal pixel.
Figure 4:
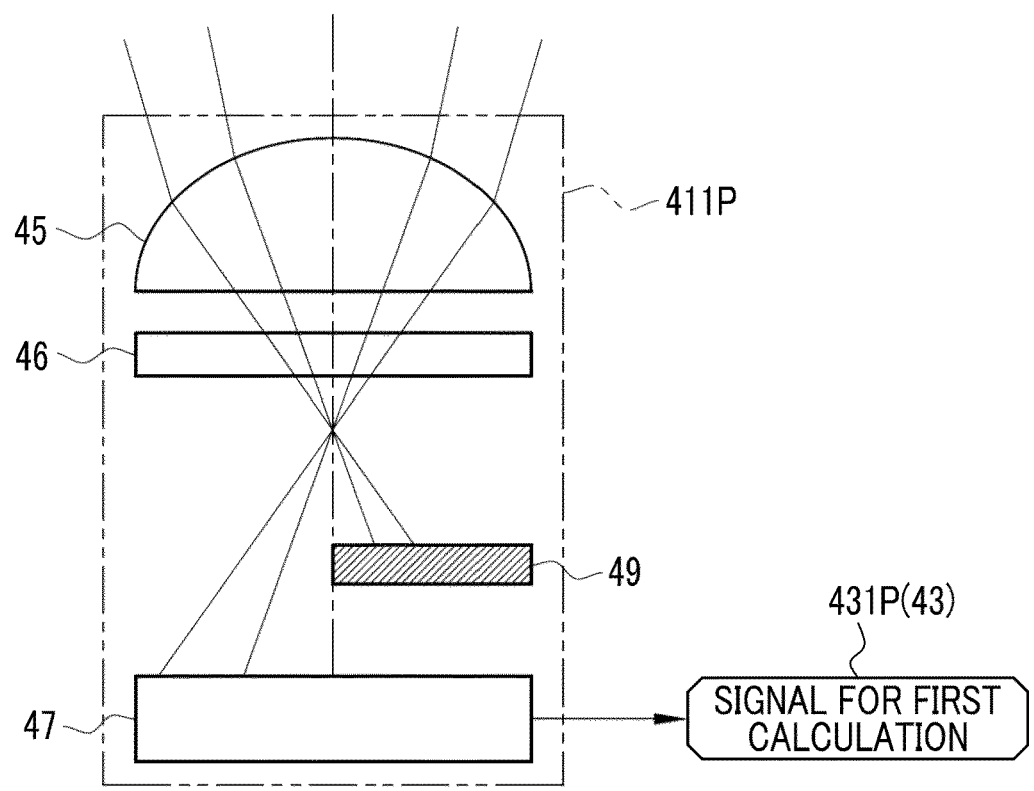
FIG. 4 is a diagram showing a configuration of a first phase difference detection pixel.
Figure 5:
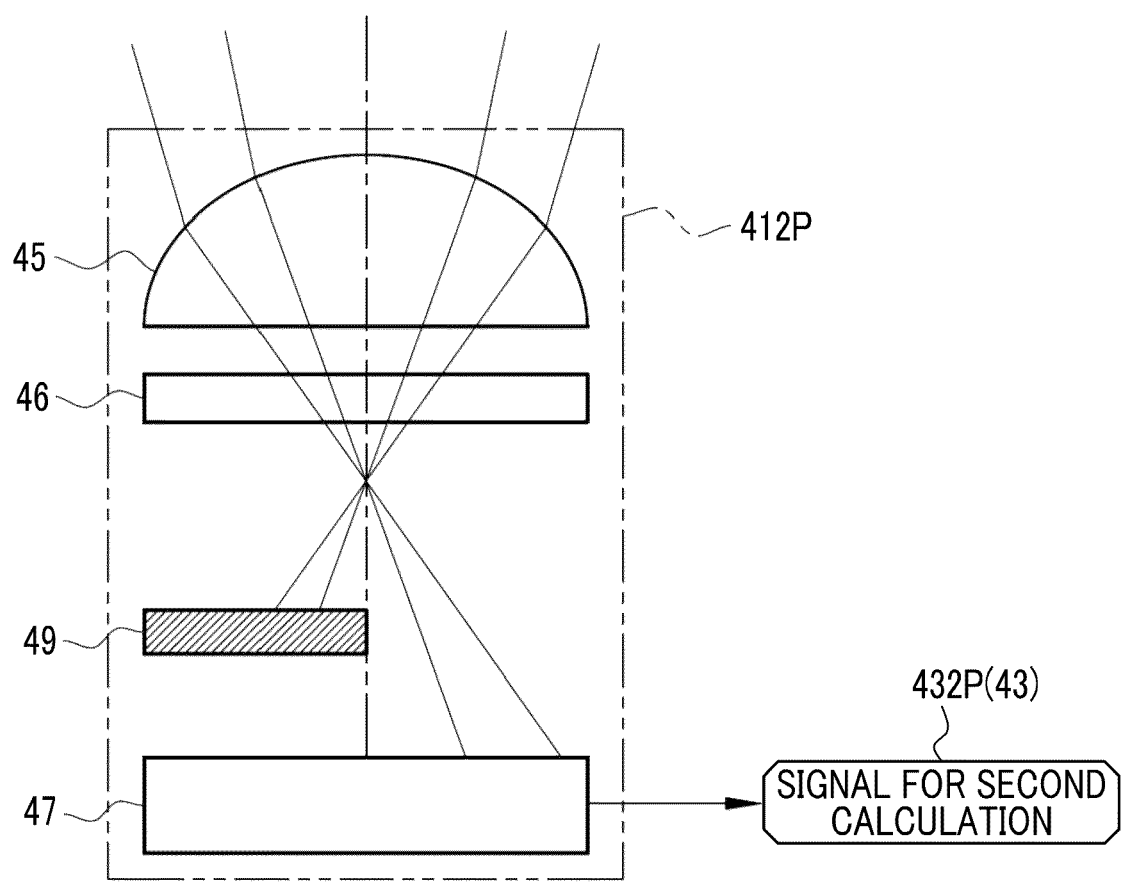
FIG. 5 is a diagram showing a configuration of a second phase difference detection pixel.

As shown in FIGS. 3 to 5 as an example, the normal pixel 41N, the first phase difference detection pixel 411P, and the second phase difference detection pixel 412P have the same basic configuration and are configured of the micro lens 45, the color filter 46, and the photoelectric conversion element 47, which are disposed in the order from the object side.

As shown in FIG. 3, the photoelectric conversion element 47 of the normal pixel 41N outputs, as the image signal 43, a signal for image generation 43N corresponding to the subject light that is condensed by the micro lens 45 and transmitted through the color filter 46. The signal for image generation 43N is stored in the image memory 26 as a part of the image data.

As shown in FIGS. 4 and 5, a light shielding member 49 is disposed between the color filter 46 and the photoelectric conversion element 47 for the first phase difference detection pixel 411P and the second phase difference detection pixel 412P. The light shielding member 49 is not disposed in the normal pixel 41N. The light shielding member 49 of the first phase difference detection pixel 411P shields a right half of the photoelectric conversion element 47 as viewed from the object side. On the contrary, the light shielding member 49 of the second phase difference detection pixel 412P shields a left half of the photoelectric conversion element 47 as viewed from the object side.

The photoelectric conversion element 47 of the first phase difference detection pixel 411P outputs, as the image signal 43, a signal for first calculation 431P corresponding to the subject light that is condensed by the micro lens 45 and transmitted through the color filter 46, and whose right half is shielded by the light shielding member 49. On the contrary, the photoelectric conversion element 47 of the second phase difference detection pixel 412P outputs, as the image signal 43, a signal for second calculation 432P corresponding to the subject light that is condensed by the micro lens 45 and transmitted through the color filter 46, and whose left half is shielded by the light shielding member 49. The signal for first calculation 431P and the signal for second calculation 432P are stored in the image memory 26 as a part of the image data, similarly to the signal for image generation 43N. The signal for first calculation 431P and the signal for second calculation 432P are examples of "signal for calculation" according to the technique of the present disclosure. Hereinafter, in a case where the signals do not need to be particularly distinguished from each other, the signal for first calculation 431P and the signal for second calculation 432P are collectively denoted as a signal for calculation 43P.

Figure 6:
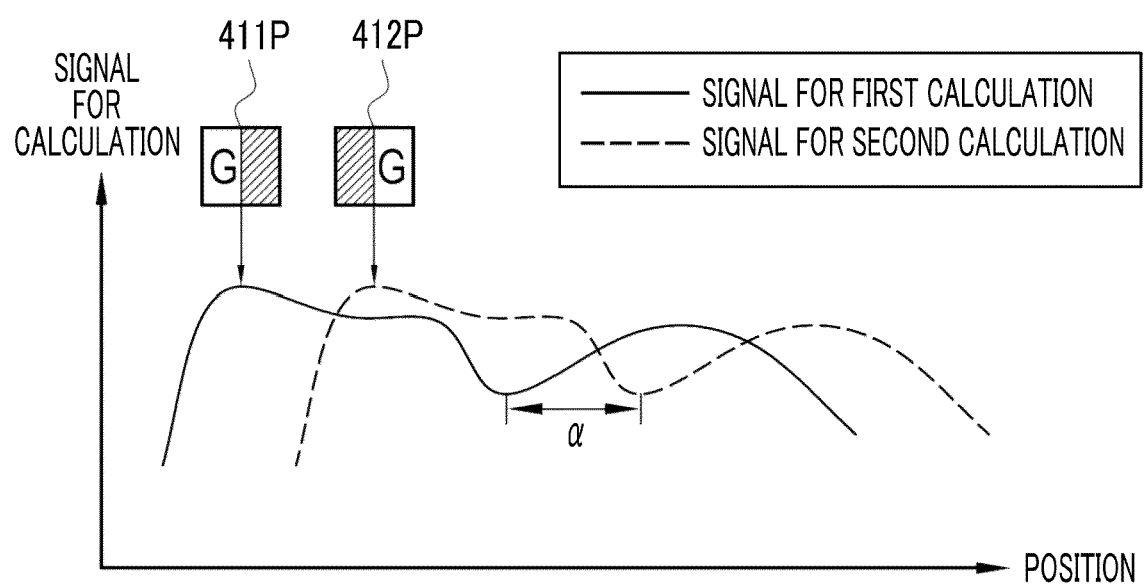
FIG. 6 is a graph showing a phase difference between a signal for first calculation and a signal for second calculation.

As shown in FIG. 6 as an example, the phase difference a appears between the signal for first calculation 431P and the signal for second calculation 432P, which are output from the first phase difference detection pixel 411P and the second phase difference detection pixel 412P adjacent to each other in the X direction and the Y direction. With the phase difference a, it is possible to know a movement direction and amount of the focus lens 14 to obtain a focusing position. The imaging apparatus 10 performs automatic focus control of calculating the focusing position of the focus lens 14 (hereinafter denoted as focusing calculation) based on the phase difference a and of automatically moving the focus lens 14 to the calculated focusing position.

As the name indicates, the signal for image generation 43N is used to generate an image such as the live view image. On the contrary, the signal for calculation 43P is used only to calculate the phase difference a and is not used to generate the image. For this reason, in the pixel interpolation processing, the image processing unit 27 interpolates a pixel value of the phase difference detection pixel 41P by using the signal for image generation 43N of the normal pixel 41N around the phase difference detection pixel 41P.

Figure 7:
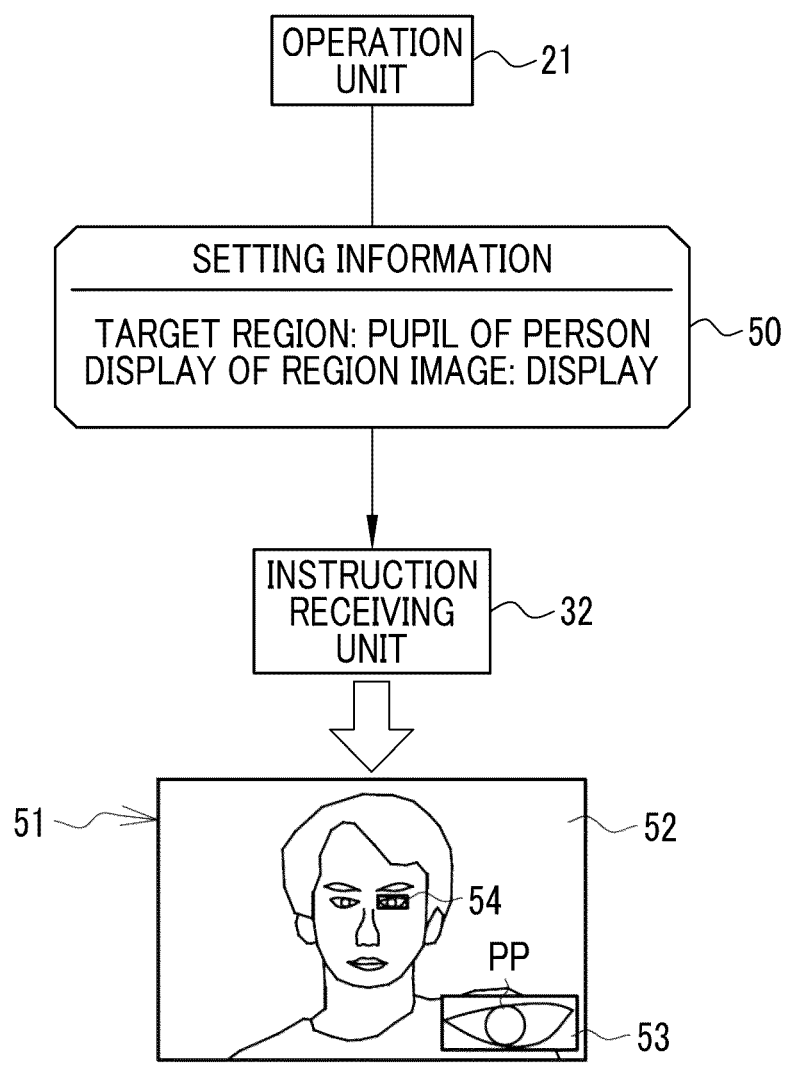
FIG. 7 is a diagram showing setting information of automatic focus control and a composite image of an entire image of a subject and a region image of a target region of the automatic focus control.

As shown in FIG. 7 as an example, the user inputs setting information 50 of the automatic focus control via the operation unit 21. The setting information 50 includes information regarding whether or not to display, as the live view image, a target region of the automatic focus control and an image 53 of the target region (hereinafter denoted as region image) together with an entire image 52 of the subject. The target region includes a region surrounding each of a face of a person, a body of a person, a pupil of an animal, a face of an animal, a body of an animal, a head of a vehicle such as automobile, railway car, or airplane, a body of a vehicle, and the like, in addition to a rectangular region surrounding a pupil PP of a person in the drawing.

Here, the pupil of the person or the animal is a pupil, that is, a so-called iris. The face of the person or the animal is a portion having, for example, a forehead, chews, a chin, eyes, a nose, a mouth, ears, and the like. The body of the person or the animal is a portion excluding the head, neck, limbs, and tail. The head of the vehicle is a front body in a case of an automobile, a portion of a head car having a destination display, a front window, a headlight, or the like in a case of a railway car, and a nose portion having a radome, front window, or the like in a case of an airplane. The body of the vehicle is the entire body excluding wheels in a case of an automobile, the entire body excluding wheels in a case of a railway car regardless of whether the car is a head car, an intermediate car, or a last car, and the entire body excluding a head, main wings, a caudal wing, and the like in a case of an airplane.

The instruction receiving unit 32 receives the setting information 50. The instruction receiving unit 32 outputs the setting information 50 to the controller 20, the image processing unit 27, and the display controller 30. The controller 20 detects a target region (here, rectangular region surrounding the pupil PP of the person) of the setting information 50, and performs the automatic focus control of focusing on the detected target region.

In a case where the region image 53 is set not to be displayed, the image processing unit 27 generates only the entire image 52. The display controller 30 performs control of displaying only the entire image 52 on the display unit as the live view image. On the contrary, in a case where the region image 53 is set to be displayed as shown in the drawing, the image processing unit 27 generates a composite image 51 shown in a lower portion of an arrow. The composite image 51 is a so-called picture-in-picture image in which the region image 53 is disposed at a lower right portion of the entire image 52 of the subject. In this case, the display controller 30 performs control of displaying the composite image 51 on the display unit as the live view image. Further, the display controller 30 displays a frame 54 indicating the target region on the entire image 52. A display size of the region image 53 is several times (for example, four times) a size of the frame 54. Hereinafter, unless otherwise specified, a case will be described in which the target region is the rectangular region surrounding the pupil PP of the person and the region image 53 is set to be displayed.

Figure 8:
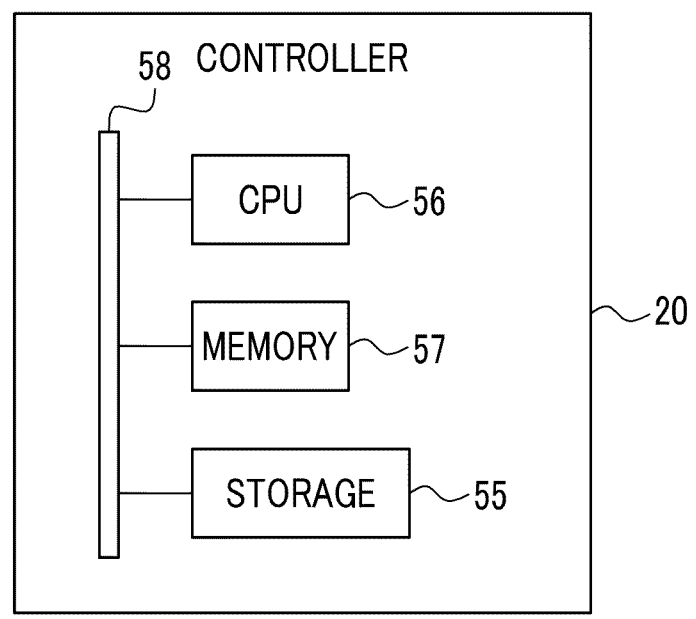
FIG. 8 is a diagram showing a detailed configuration of a controller.

As shown in FIG. 8 as an example, the controller 20 comprises a storage 55, a central processing unit (CPU) 56, and a memory 57. The storage 55, the CPU 56, and the memory 57 are connected to each other via a busline 58. The controller 20 is an example of "automatic focus control device" and "computer" according to the technique of the present disclosure. The storage 55 is a non-volatile storage device such as an electrically erasable programmable read-only memory (EEPROM). The storage 55 stores various programs, various types of data associated with the various programs, and the like. Instead of the EEPROM, a ferroelectric random access memory (FeRAM) or a magnetoresistive random access memory (MRAM) may be used as the storage 55.

The memory 57 is a work memory for the CPU 56 to execute the processing. The CPU 56 loads the program stored in the storage 55 into the memory 57 to execute the processing according to the program. With the above, the CPU 56 controls each unit of the imaging apparatus 10 in an integrated manner. The CPU 56 is an example of "processor" according to the technique of the present disclosure. The memory 57 may be built into the CPU 56.

Figure 9:
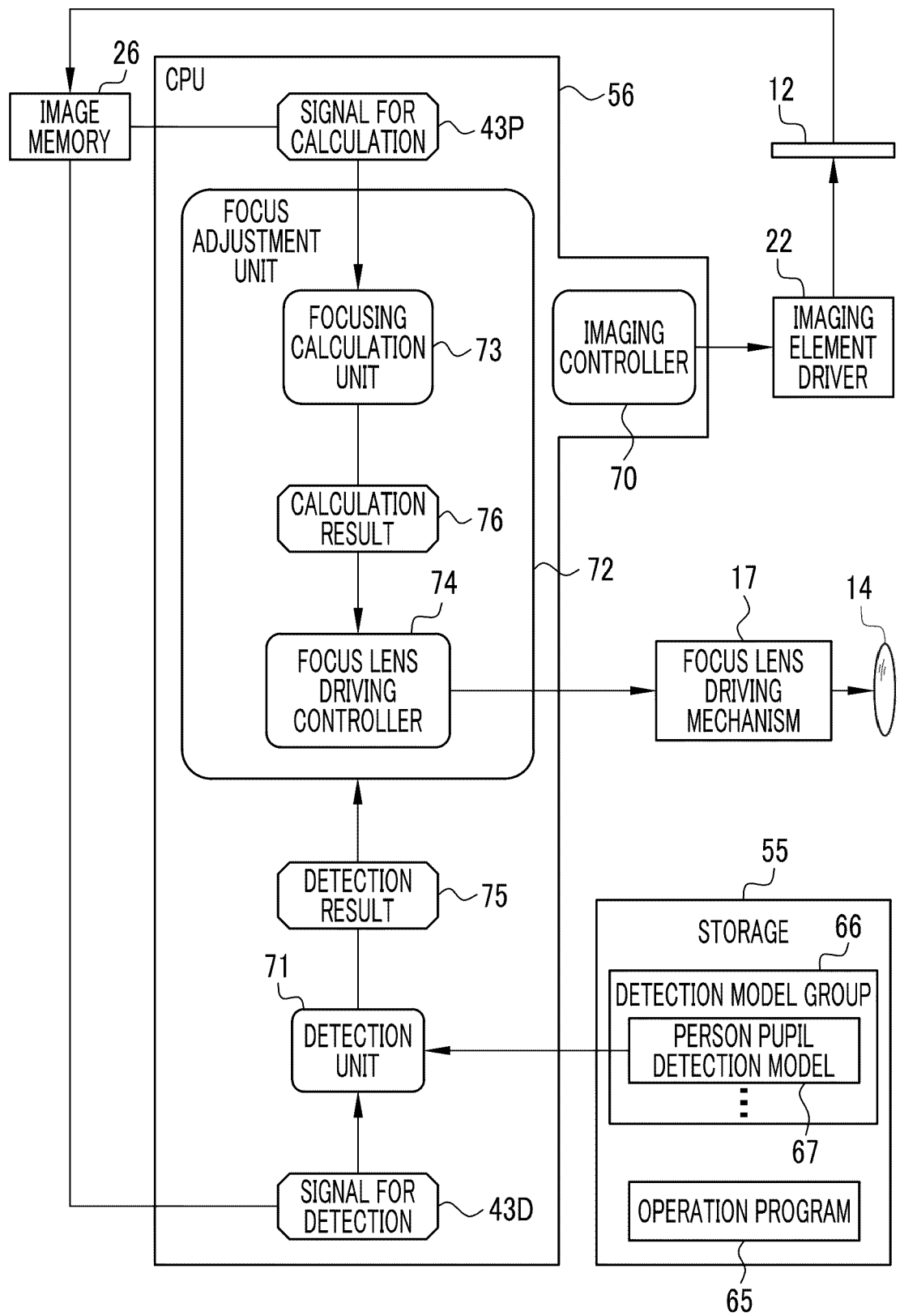
FIG. 9 is a block diagram showing a processing unit of a CPU.

As shown in FIG. 9 as an example, an operation program 65 is stored in the storage 55. The operation program 65 is a program that causes the CPU 56 to perform the automatic focus control and the like. That is, the operation program 65 is an example of "operation program of automatic focus control device" according to the technique of the present disclosure.

A detection model group 66 is also stored in the storage 55, in addition to the operation program 65. The detection model group 66 is a set of a plurality of machine learning models for detecting each of a plurality of target regions, and includes a person pupil detection model 67 for detecting the rectangular region surrounding the pupil PP of the person as the target region, and the like. The machine learning model, such as the person pupil detection model 67, is constructed by, for example, a convolutional neural network.

In a case where the operation program 65 is started, the CPU 56 functions as an imaging controller 70, a detection unit 71, and a focus adjustment unit 72, in cooperation with the memory 57 and the like. The focus adjustment unit 72 includes a focusing calculation unit 73 and a focus lens driving controller 74.

The imaging controller 70 controls the drive of the imaging element 12 via the imaging element driver 22.

The detection unit 71 reads out a signal for detection 43D from the image memory 26. The signal for detection 43D is the image signal 43 for detecting the target region. The signal for detection 43D can be handled as two-dimensional image data. The detection unit 71 detects the target region from the signal for detection 43D by using the machine learning model corresponding to the target region of the setting information 50 among the plurality of machine learning models of the detection model group 66. The detection unit 71 outputs a detection result 75 of the target region to the focus adjustment unit 72.

The focusing calculation unit 73 of the focus adjustment unit 72 reads out the signal for calculation 43P from the image memory 26. Specifically, the signal for calculation 43P is data in which a plurality of signals for first calculation 431P output from the first phase difference detection pixel 411P are two-dimensionally arranged in the X direction and the Y direction following the arrangement of the first phase difference detection pixels 411P, and data in which a plurality of signals for second calculation 432P output from the second phase difference detection pixel 412P are two-dimensionally arranged in the X direction and the Y direction following the arrangement of the second phase difference detection pixels 412P. Therefore, the signal for calculation 43P can be handled as the two-dimensional image data like the signal for detection 43D.

The focusing calculation unit 73 calculates the phase difference a shown in FIG. 6 from the signal for calculation 43P. The focusing calculation unit 73 calculates the focusing position of the focus lens 14 based on the phase difference a. The focusing calculation unit 73 outputs a calculation result 76 of the focusing position of the focus lens 14 to the focus lens driving controller 74. Since a method of calculating the focusing position of the focus lens 14 based on the phase difference a is known, the detailed description thereof will be omitted here.

The focus lens driving controller 74 controls the drive of the focus lens driving mechanism 17 and thus the focus lens 14. Specifically, the focus lens driving controller 74 moves the focus lens 14 to the focusing position of the calculation result 76 via the focus lens driving mechanism 17. In a case where a current position of the focus lens 14 is the same as the focusing position of the calculation result 76, as a matter of course, the focus lens driving controller 74 does nothing and the focus lens 14 is not moved.

Figure 10:
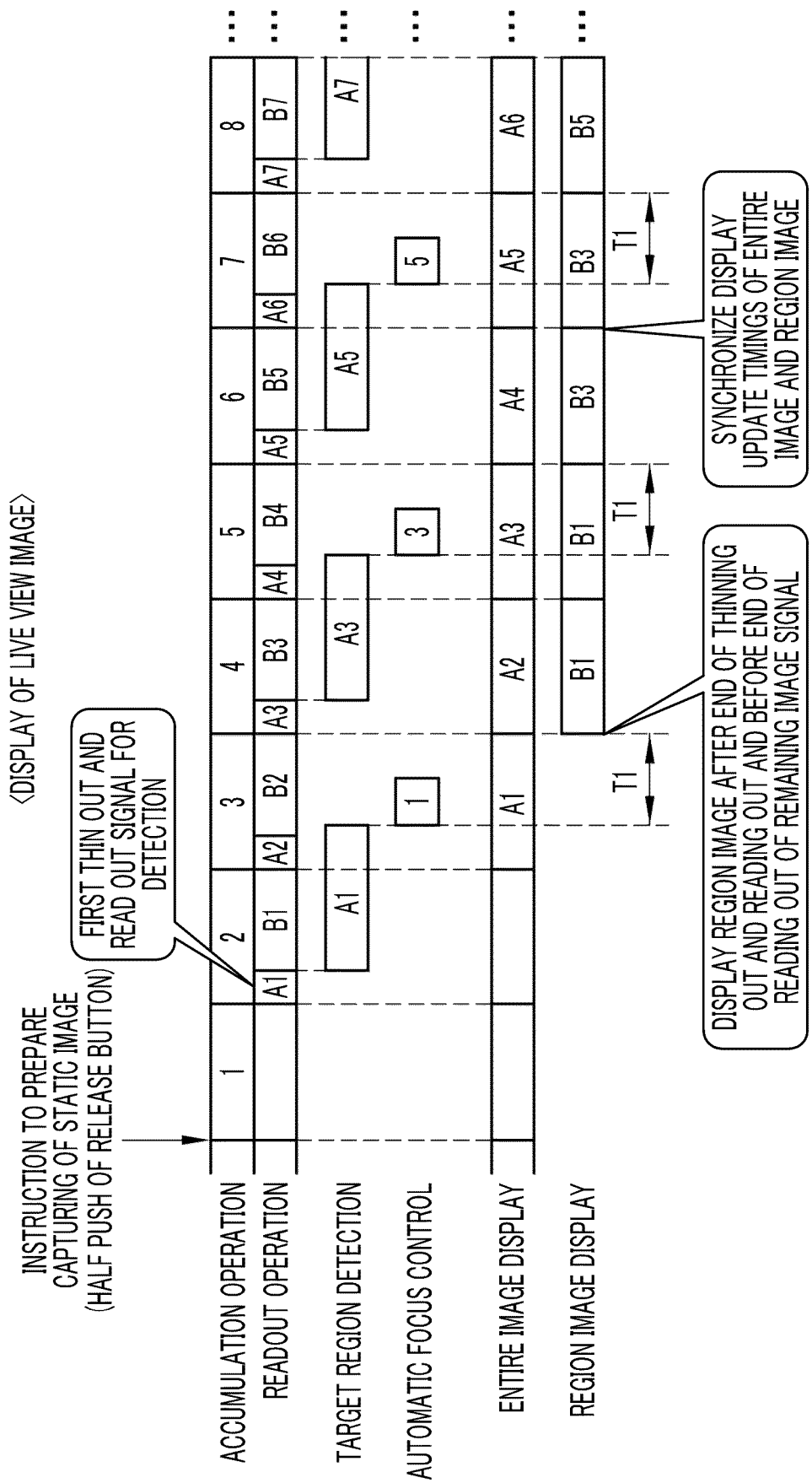
FIG. 10 is a diagram showing a flow of accumulation operation, readout operation, target region detection, automatic focus control, entire image display, and region image display, while a live view image is displayed.

For example, as shown in FIG. 10, in a case where the release button is half-pushed in the static-image capturing mode and the instruction receiving unit 32 receives the instruction to prepare capturing of a static image, the imaging controller 70 repeats the accumulation operation and the readout operation at a predetermined frame rate (for example, 60 fps). The imaging controller 70 first thins out and reads out the signal for detection 43D in the readout operation of each frame. Hereinafter, the readout operation of thinning out and reading out the signal for detection 43D is denoted as a readout operation A. Numbers shown in FIG. 10 indicate frame numbers of the image data after the instruction to prepare the capturing is issued. The same applies to subsequent FIG. 18 and the like.

Figure 12:
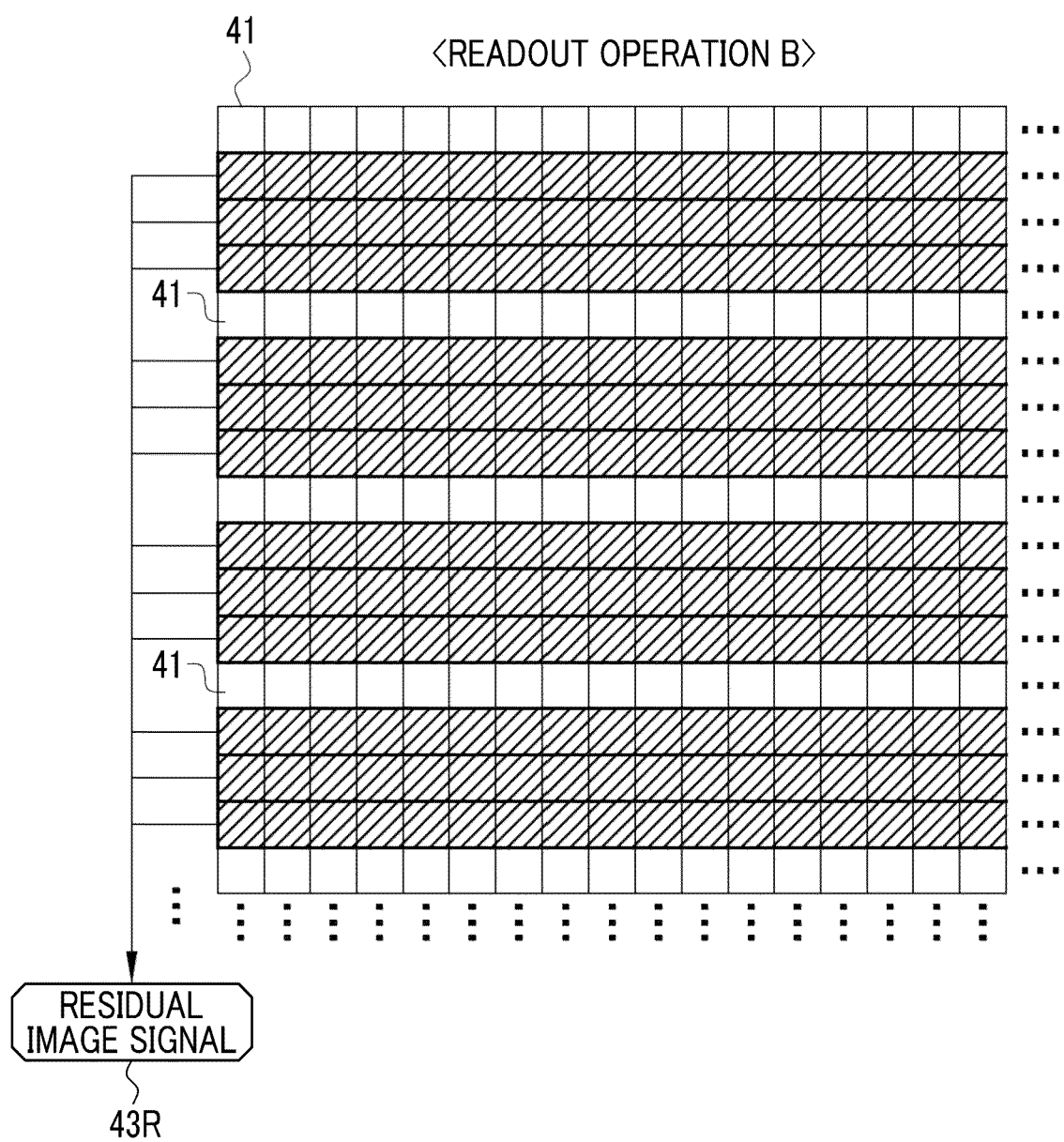
FIG. 12 is a diagram showing the readout operation of a remaining image signal.

After the end of the readout operation A, the imaging controller 70 reads out a remaining image signal (hereinafter denoted as residual image signal) 43R (refer to FIG. 12). Hereinafter, the readout operation of reading out the residual image signal 43R will be denoted as a readout operation B.

As soon as the readout operation A ends, the detection unit 71 starts the detection of the target region based on the signal for detection 43D obtained in the readout operation A. In some cases, a processing time required for the detection of the target region is equal to or longer than a time required for the accumulation operation of one frame. Therefore, the detection unit 71 detects the target region for every other frame.

The focus adjustment unit 72 performs the automatic focus control based on the signal for calculation 43P obtained in the readout operation A and the readout operation B. The focus adjustment unit 72 performs the automatic focus control for every other frame, as in the detection of the target region by the detection unit 71.

The display controller 30 sequentially updates the display of the entire image 52 at a predetermined frame rate. Further, the display controller 30 starts to display the region image 53 in a live view after an end of a readout operation B2 of a second frame after the detection of the target region of a first frame is ended (at a time of starting the accumulation operation of a fourth frame). Then, the display of the region image 53 is updated. The display controller 30 displays the region image 53 after the end of the readout operation A (for example, readout operations A3, A5, A7, and the like) and before the end of the readout operation B (for example, readout operations B3, B5, B7, and the like).

Further, the display controller 30 synchronizes display update timings of the entire image 52 and the region image 53. The synchronization of the display update timings of the entire image 52 and the region image 53 means that switching of the display of the entire image 52 from a previous frame to a current frame and switching of the display of the region image 53 from the previous frame to the current frame are performed at the same timing. Here, the terms "synchronization" and "same" indicate synchronization and same in a sense including an error generally allowed in the technical field to which the technique of the present disclosure belongs, in addition to perfect synchronization and same. A time T1 indicates a time lag from an end of the detection of the target region in the detection unit 71 to the start or update of the display of the region image 53.

The display controller 30 continues to display the region image 53 corresponding to the detection result 75 of a previous target region until next detection of the target region is ended. That is, the display of the entire image 52 is sequentially updated for every frame, whereas the display of the region image 53 is updated after the same image is displayed over two frames. For this reason, a display delay of the region image 53 with respect to the entire image 52 is two frames at the maximum.

Figure 11:
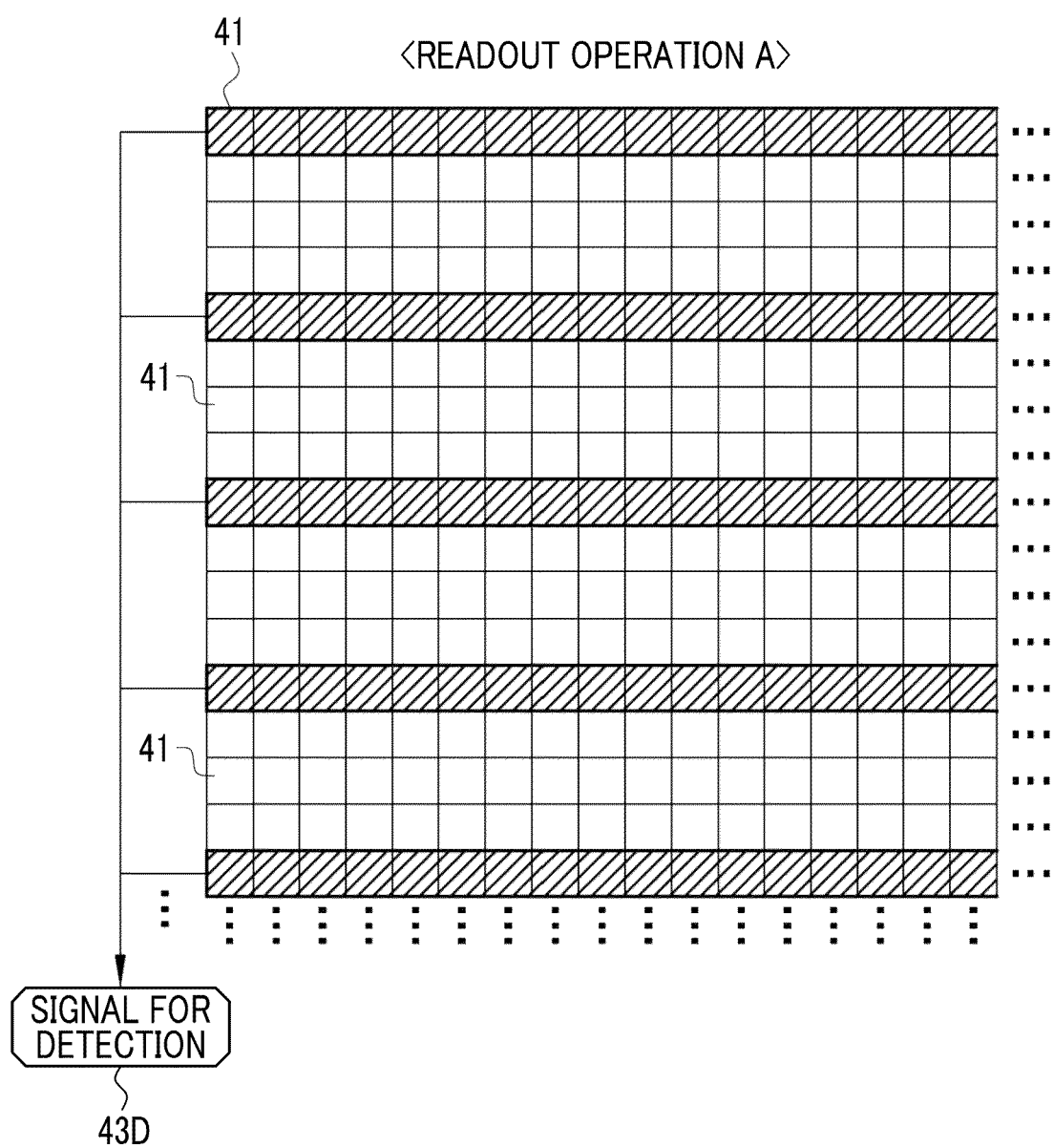
FIG. 11 is a diagram showing the readout operation of signals for detection.

As shown by hatching in FIG. 11 as an example, in the readout operation A, the signals for detection 43D as the image signals 43 are sequentially read out at a four-row spacing, such as the pixels 41 in a first row, the pixels 41 in a fifth row, the pixels 41 in a ninth row, the pixels 41 in a thirteenth row, the pixels 41 in a seventeenth row, and the like. On the contrary, as shown by hatching in FIG. 12 as an example, in the readout operation B, the residual image signals 43R as the image signals 43 are sequentially read out from the pixels 41 in a row skipped in the readout operation A, such as the pixels 41 in second to fourth rows, the pixels 41 in sixth to eighth rows, the pixels 41 in tenth to twelfth rows, the pixels 41 in fourteenth to sixteenth rows, and the like. The row spacing in the readout operation A is not limited to the illustrated four-row spacing. The row spacing may be a one-row spacing or a three-row spacing. As long as the target region can be detected from the signal for detection 43D, an eight-row spacing or a twelve-row spacing may be employed.

Figure 13:
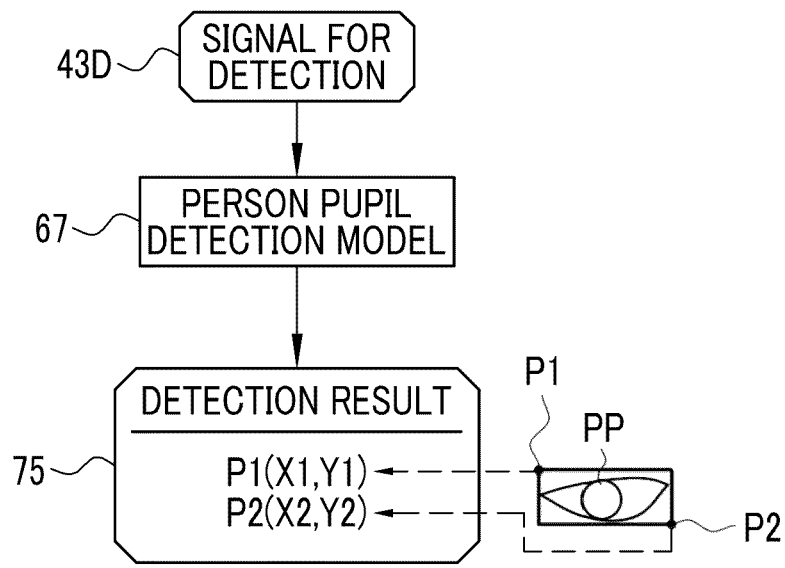
FIG. 13 is a diagram showing details of a detection result.

As shown in FIG. 13 as an example, the detection unit 71 inputs (two-dimensional image data represented by) the signal for detection 43D to the person pupil detection model 67. Accordingly, the detection result 75 is output from the person pupil detection model 67. The detection result 75 is, for example, XY coordinates of two diagonal points P1 and P2 of the rectangular region surrounding the pupil PP of the person.

Figure 14:
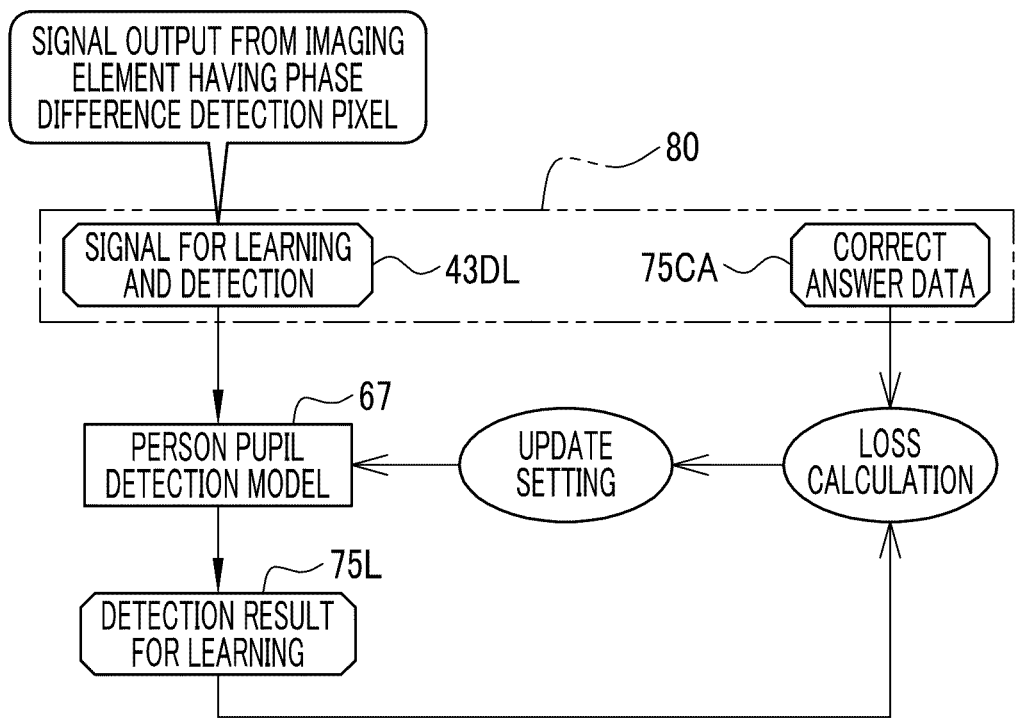
FIG. 14 is a diagram showing an outline of processing in a learning phase of a person pupil detection model.

As shown in FIG. 14 as an example, in a learning phase of the person pupil detection model 67, learning data (also referred to as supervised data, training data) 80 is provided for learning. The learning data 80 is a set of a signal for learning and detection 43DL and correct answer data 75CA. The signal for learning and detection 43DL is the signal for detection 43D output from an imaging element having a phase difference detection pixel, similarly to the imaging element 12. The signal for learning and detection 43DL is an example of "image output from imaging element having phase difference detection pixel" according to the technique of the present disclosure. The correct answer data 75CA is data in which the rectangular region surrounding the pupil PP of the person is manually annotated on (the two-dimensional image data represented by) the signal for learning and detection 43DL.

In the learning phase, the signal for learning and detection 43DL is input to the person pupil detection model 67. Accordingly, a detection result for learning 75L is output from the person pupil detection model 67. The detection result for learning 75L is compared with the correct answer data 75CA, and loss calculation of the person pupil detection model 67 using a loss function is performed based on a comparison result. Next, update setting of a coefficient of the person pupil detection model 67 is performed according to a result of the loss calculation, and the person pupil detection model 67 is updated according to the update setting.

In the learning phase, the series of pieces of processing of the input of the signal for learning and detection 43DL to the person pupil detection model 67, the output of the detection result for learning 75L from the person pupil detection model 67, the loss calculation, the update setting, and the update of the person pupil detection model 67 is repeatedly performed while the learning data 80 is exchanged. In a case where the detection accuracy of the detection result for learning 75L with respect to the correct answer data 75CA reaches a preset level, the repetition of the series of pieces of processing is ended, and the person pupil detection model 67 at that time is stored in the storage 55 to be used in the detection unit 71. The learning may be ended in a case where the series of pieces of processing is repeated a predetermined number of times, regardless of the detection accuracy of the detection result for learning 75L with respect to the correct answer data 75CA. Although not shown, in the machine learning model of the detection model group 66 other than the person pupil detection model 67, similarly to the person pupil detection model 67, the learning is also performed by using the signal for learning and detection 43DL output from the imaging element having the phase difference detection pixel.

Figure 15:
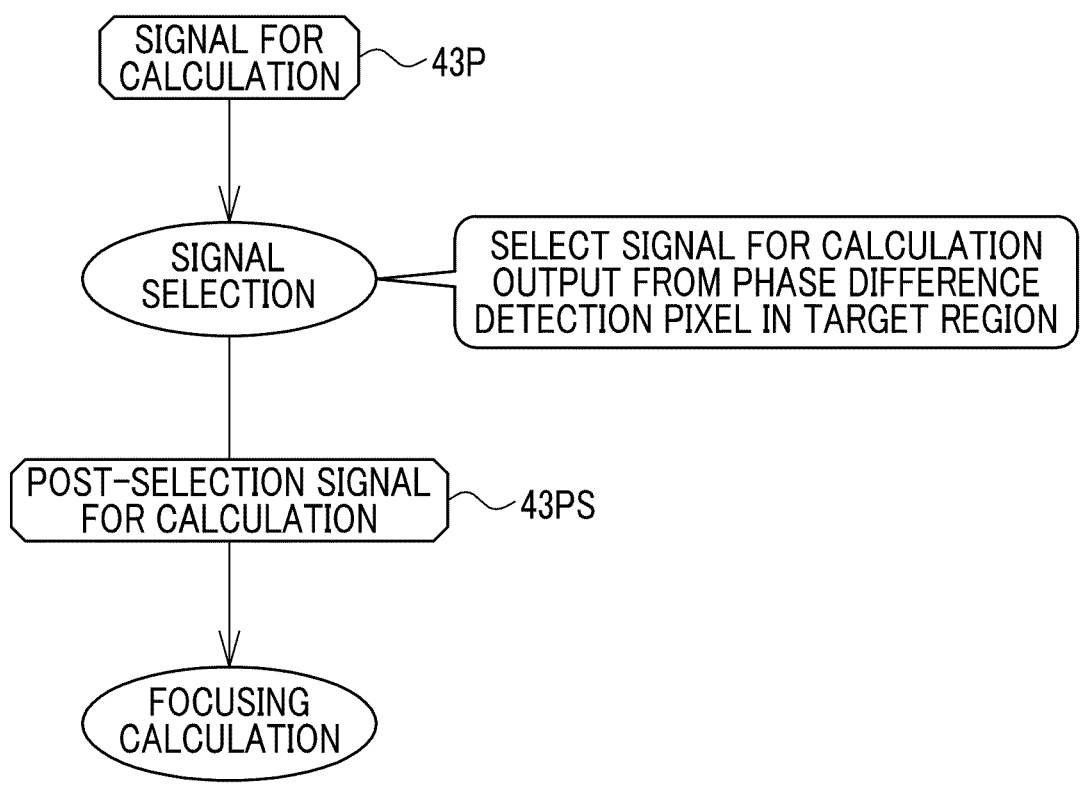
FIG. 15 is a diagram showing processing of a focusing calculation unit.

As shown in FIG. 15 as an example, the focusing calculation unit 73 selects, among all the signals for calculation 43P read out in the readout operations A and B, the signal for calculation 43P output from the phase difference detection pixel 41P in the target region based on the detection result 75 of the target region from the detection unit 71. The focusing calculation unit 73 performs the focusing calculation using a post-selection signal for calculation 43PS, which is a selected signal for calculation 43P.

Figure 16:
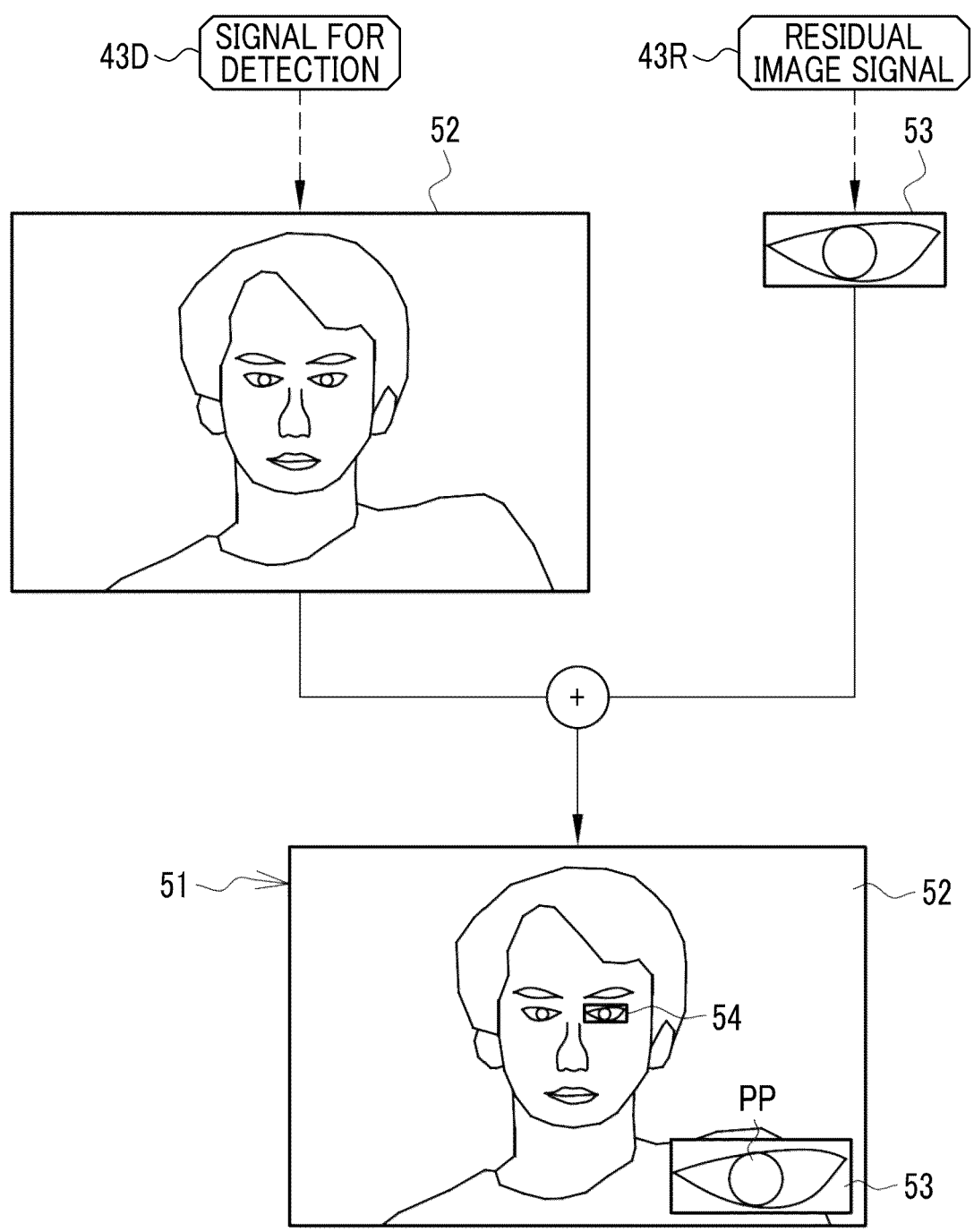
FIG. 16 is a diagram showing a method of generating the composite image.

As shown in FIG. 16 as an example, the image processing unit 27 generates the entire image 52 from the signal for detection 43D and generates the region image 53 from the residual image signal 43R. In this case, the image processing unit 27 performs the pixel interpolation processing to generate the entire image 52 by interpolating the pixel value for the residual image signal 43R and to generate the region image 53 by interpolating the pixel value for the signal for detection 43D. The composite image 51 is generated from the entire image 52 and the region image 53.

Figure 17:
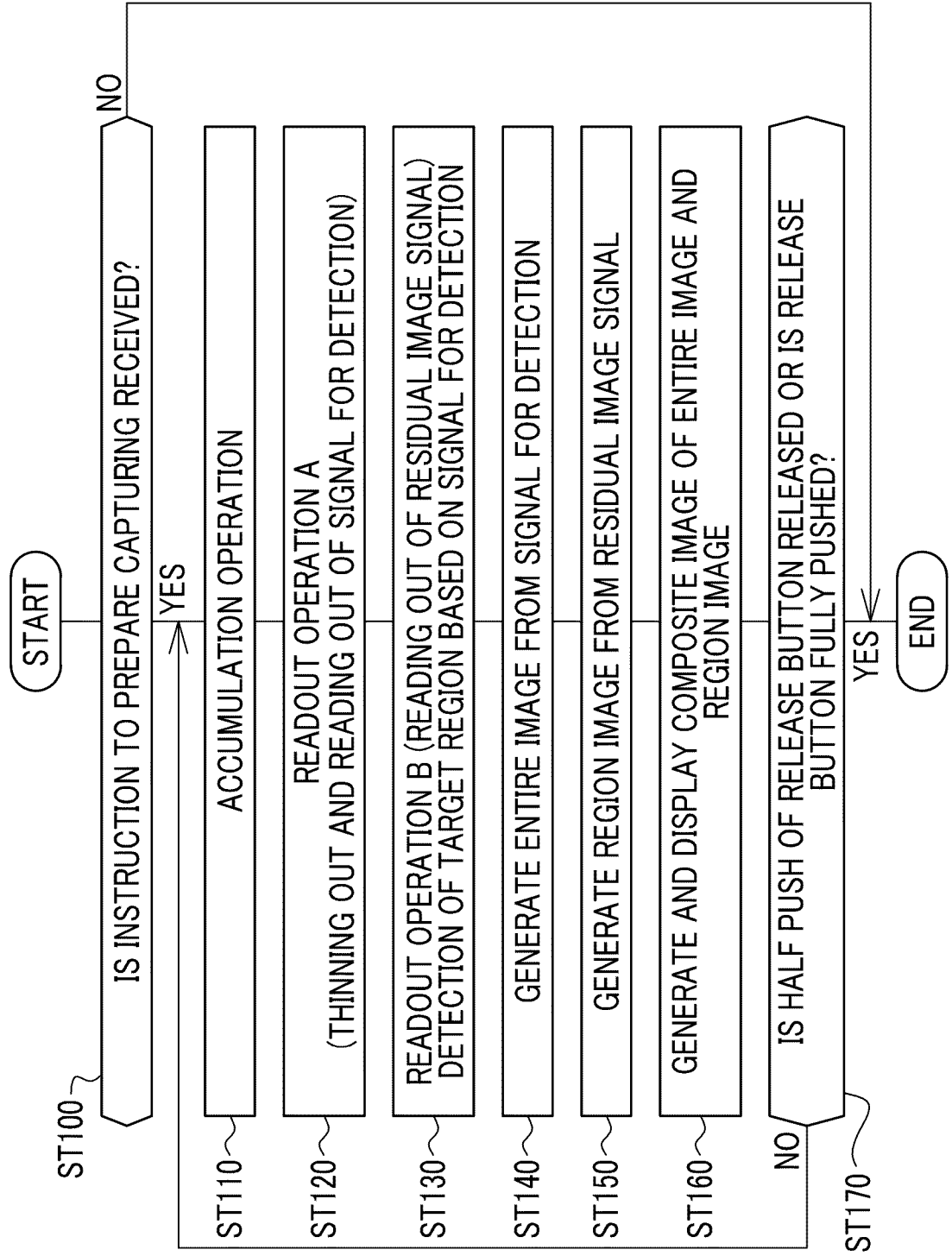
FIG. 17 is a flowchart showing a processing procedure of a CPU.

Next, an action of the above configuration will be described with reference to a flowchart shown in FIG. 17 as an example. As shown in FIG. 9, the CPU 56 functions, with the start of the operation program 65, as the imaging controller 70, the detection unit 71, and the focus adjustment unit 72 (the focusing calculation unit 73 and the focus lens driving controller 74).

In a case where the release button is half-pushed in the static-image capturing mode and the instruction receiving unit 32 receives the instruction to prepare capturing of a static image (YES in step ST100), as shown in FIG. 10, the imaging element 12 performs the accumulation operation of the signal charge corresponding to the subject light under the control of the imaging controller 70 (step ST110). Subsequently, the readout operation A shown in FIG. 11 is performed as the readout operation of the image signal 43 corresponding to the signal charge (step ST120). Accordingly, the signal for detection 43D for detecting the target region of the automatic focus control is thinned out and read out first. Subsequently, the readout operation B shown in FIG. 12 is further performed (step ST130). Accordingly, the residual image signal 43R other than the signal for detection 43D is read out.

Simultaneously with the end of the readout operation A (the start of the readout operation B), as shown in FIG. 13, in the detection unit 71, the signal for detection 43D is input to the person pupil detection model 67, and the detection result 75 of the target region is output from the person pupil detection model 67 (step ST130). The detection result 75 is output from the detection unit 71 to the focus adjustment unit 72.

As shown in FIG. 15, the focusing calculation unit 73 selects, among the signals for calculation 43P from the image memory 26, the signal for calculation 43P output from the phase difference detection pixel 41P in the target region based on the detection result 75. The focusing calculation is performed by using the post-selection signal for calculation 43PS. The calculation result 76 of the focusing calculation is output from the focusing calculation unit 73 to the focus lens driving controller 74. Under the control of the focus lens driving controller 74, the focus lens 14 is moved to the focusing position of the calculation result 76 via the focus lens driving mechanism 17.

As shown in FIG. 16, the image processing unit 27 generates the entire image 52 from the signal for detection 43D (step ST140). Further, the region image 53 is generated from the residual image signal 43R (step ST150). The composite image 51 is generated from the entire image 52 and the region image 53 (step ST160). The composite image 51 is displayed on the display unit under the control of the display controller 30 (step ST160). The processing of steps ST110 to ST160 is repeatedly performed until the half push of the release button is released or the release button is fully pushed and the instruction to start capturing of a static image is not issued (NO in step ST170). The detection of the target region by the detection unit 71 in step ST130, the focusing calculation by the focusing calculation unit 73, and the generation of the region image 53 by the image processing unit 27 in step ST150 are performed for every other frame.

As described above, the CPU 56 of the controller 20 of the imaging apparatus 10 comprises the imaging controller 70, the detection unit 71, and the focus adjustment unit 72. The imaging controller 70 controls the readout operation of the image signal 43 from the imaging element 12. The detection unit 71 detects the target region of the automatic focus control. The focus adjustment unit 72 performs the automatic focus control based on the target region. In the readout operation, the imaging controller 70 first thins out and reads out the signal for detection 43D, which is the image signal 43 for detecting the target region, and reads out the residual image signal 43R after the thinning out and reading out ends.

Figure 18:
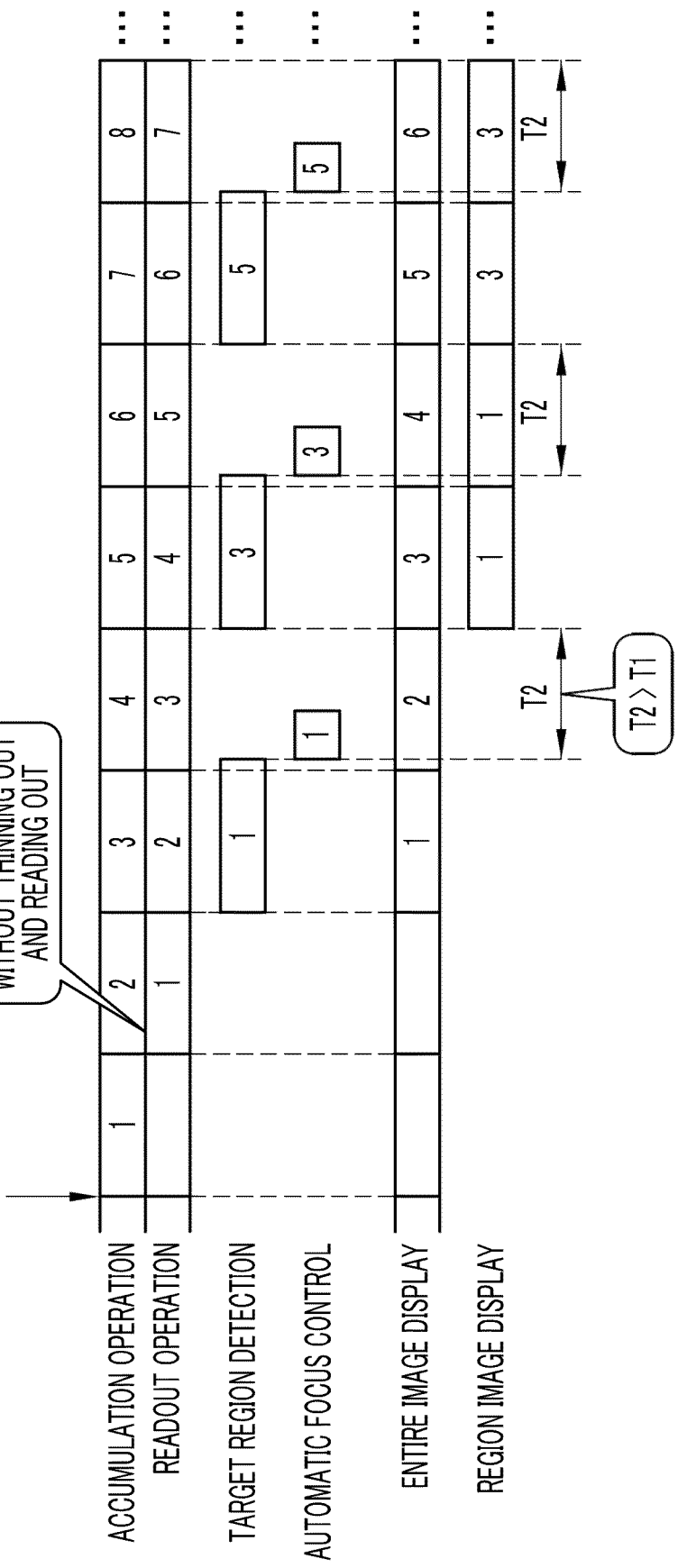
FIG. 18 is a diagram showing a flow of accumulation operation, readout operation, target region detection, automatic focus control, entire image display, and region image display, while a live view image is displayed, in the related art.

FIG. 18 shows an aspect in the related art as Comparative Example. In the aspect in the related art, the image signals 43 are sequentially read out without thinning out and reading out the signal for detection 43D at the beginning of the readout operation as in the technique of the present disclosure. In this case, the detection unit 71 starts the detection of the target region after a readout operation 1 of a first frame ends. For this reason, a detection timing of the target region is delayed as compared with the technique of the present disclosure.

The display controller 30 starts to display the region image 53 in a live view after an end of a readout operation 3 of a third frame after the detection of the target region of a first frame is ended (at a time of starting the accumulation operation of a fifth frame). That is, a start timing of the live view display of the region image 53 is delayed by one frame as compared with the technique of the present disclosure. For this reason, a display delay of the region image 53 with respect to the entire image 52 is three frames at the maximum.

A time T2 indicating a time lag from the end of the detection of the target region in the detection unit 71 to the start or update of the display of the region image 53 is longer than the time T1 in the technique of the present disclosure shown in FIG. 10. For this reason, in a case where the subject is in motion, there is an increasing concern that the detection of the target region and the display update of the region image 53 cannot keep up with the movement of the subject and a region that is not the target region is displayed as the region image 53.

On the contrary, in the technique of the present disclosure, as shown in FIG. 10, the signal for detection 43D is first thinned out and read out to advance the detection start timing of the target region. With the above, the time T1 indicating the time lag from the end of the detection of the target region in the detection unit 71 to the start or update of the display of the region image 53 by reflecting the detection result 75 can be shortened as compared with the time T2 in the aspect in the related art. Therefore, it is possible to suppress a display deviation of the region image 53 caused by the movement of the subject.

As shown in FIG. 10, the display controller 30 performs control of displaying, on the display unit, the region image 53 after the end of the readout operation A and before the end of the readout operation B. Therefore, it is possible to advance a timing at which the display of the region image 53 is started or updated.

As shown in FIGS. 10 and 16, the image processing unit 27 generates the entire image 52 of the subject from the image signal 43 (signal for detection 43D). The display controller 30 performs control of displaying the entire image 52 and the region image 53 together on the display unit while updating the display. Therefore, the user can perform imaging while comparing the entire image 52 and the region image 53.

As shown in FIG. 10, in a case where the instruction receiving unit 32 receives the instruction to prepare capturing of a static image, that is, while the live view image is displayed, the imaging controller 70 causes the imaging element 12 to thin out and read out the signal for detection 43D. Therefore, it is possible to check whether or not the target region is in focus before imaging without significant hindrance even though the subject is in motion.

As shown in FIG. 16, the image processing unit 27 generates at least the region image 53 from the residual image signal 43R. Therefore, it is possible to generate the region image 53 having good image quality as compared with a case where the region image 53 is generated from the signal for detection 43D. With the region image 53 having relatively good image quality, it is easy to check whether or not the target region is in focus and thus it is suitable before imaging. Not only the region image 53 but also the entire image 52 may be generated from the residual image signal 43R.

As shown in FIG. 10, the display controller 30 synchronizes the display update timings of the entire image 52 and the region image 53. Since the display update timings of the entire image 52 and the region image 53 are aligned, the user does not feel discomfort.

As shown in FIGS. 2, 4, and 5, the imaging element 12 has the phase difference detection pixel 41P for detecting the phase difference a of the subject light. As shown in FIGS. 9 and 15, the focus adjustment unit 72 performs the automatic focus control using the signal for calculation 43P output from the phase difference detection pixel 41P. Therefore, it is possible to perform the automatic focus control with ease and at high speed.

As shown in FIGS. 13 and 14, the detection unit 71 detects the target region from the signal for detection 43D by using the machine learning model such as the person pupil detection model 67 subjected to learning using the signal for learning and detection 43DL, which is an image output from the imaging element having the phase difference detection pixel. Therefore, it is possible to improve the detection accuracy of the target region as compared with a case where a machine learning model subjected to learning using an image output from an imaging element not having the phase difference detection pixel is used.

Even while the live view image is displayed before the release button is half-pushed in the static-image capturing mode and the instruction to prepare capturing of a static image is issued, the thinning out and reading out of the signal for detection 43D by the imaging controller 70, the detection of the target region by the detection unit 71, the automatic focus control by the focus adjustment unit 72, the generation of the entire image 52 and the region image 53 by the image processing unit 27, and the display of the entire image 52 and the region image 53 by the display controller 30 may be performed.

Alternatively, while the live view image is displayed before the instruction to prepare capturing of a static image is issued, the thinning out and reading out of the signal for detection 43D by the imaging controller 70, the detection of the target region by the detection unit 71, the generation of the entire image 52 and the region image 53 by the image processing unit 27, and the display of the entire image 52 and the region image 53 by the display controller 30 may be performed, but the automatic focus control by the focus adjustment unit 72 may not be performed. In this case, the following may be performed. That is, as the machine learning model for detecting the target region, the machine learning model subjected to learning using the image output from the imaging element not having the phase difference detection pixel is prepared. While the live view image is displayed before the instruction to prepare capturing of a static image is issued, the machine learning model subjected to learning using the image output from the imaging element not having the phase difference detection pixel is used. On the other hand, after the instruction to prepare capturing of a static image is issued, the machine learning model is switched to the machine learning model subjected to learning using the image output from the imaging element having the phase difference detection pixel.

Second Embodiment

Figure 19:
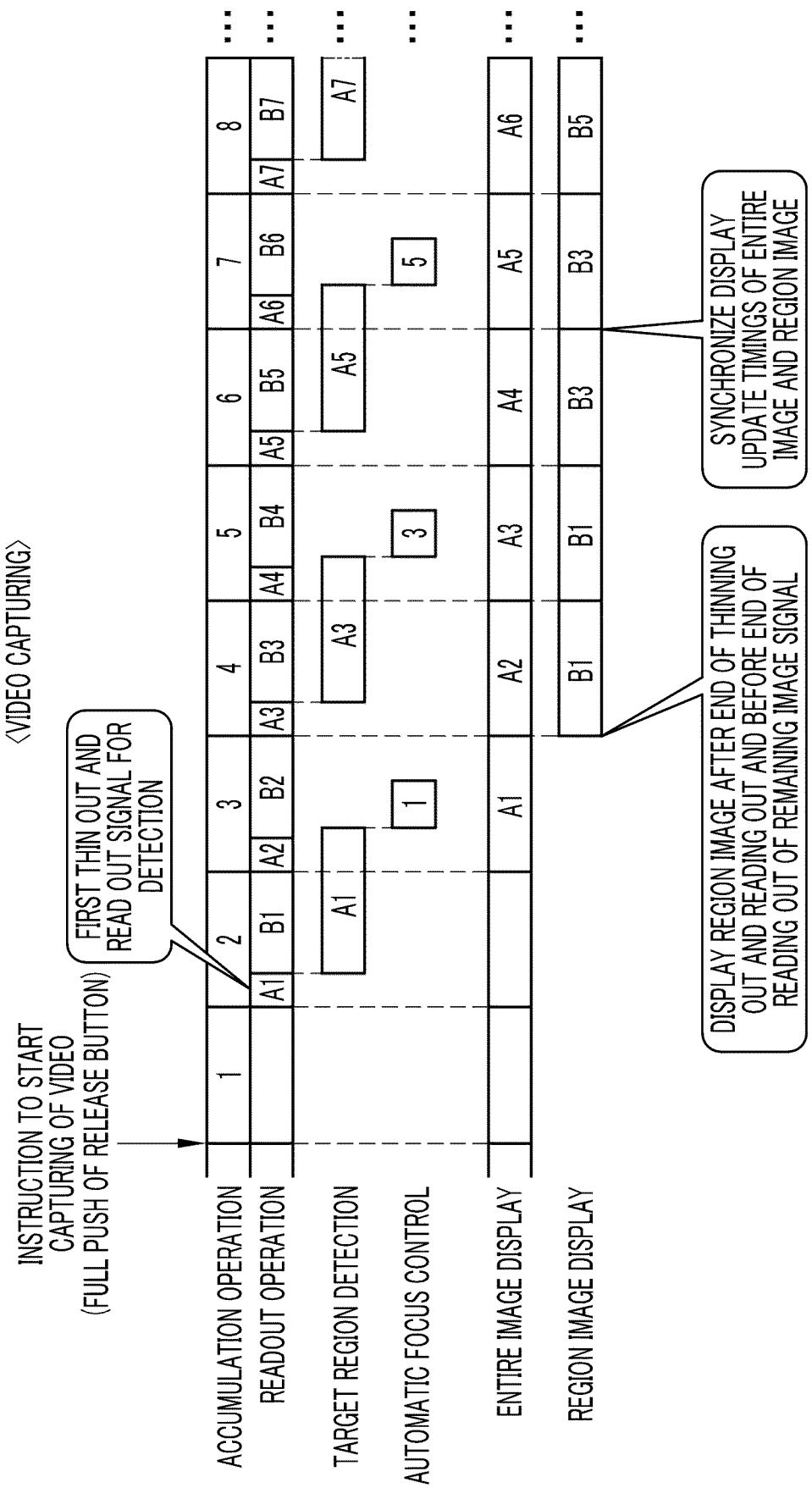
FIG. 19 is a diagram showing a flow of accumulation operation, readout operation, target region detection, automatic focus control, entire image display, and region image display, while a video is captured.

In the first embodiment, the example has been described in which the thinning out and reading out is performed while the live view image is displayed, but the present disclosure is not limited thereto. As shown in FIG. 19 as an example, in a case where the release button is fully pushed in the video imaging mode and the instruction receiving unit 32 receives the instruction to start capturing a video, that is, while the video is captured, the imaging element 12 may be caused to thin out and read out the signal for detection 43D. A flow of the accumulation operation and readout operation of the imaging element 12 by the imaging controller 70, the detection of the target region by the detection unit 71, the automatic focus control by the focus adjustment unit 72, and the display of the entire image 52 and the region image 53 by the display controller 30 is the same as that in the case shown in FIG. 10 of the first embodiment, and thus the description thereof will be omitted.

Figure 20:
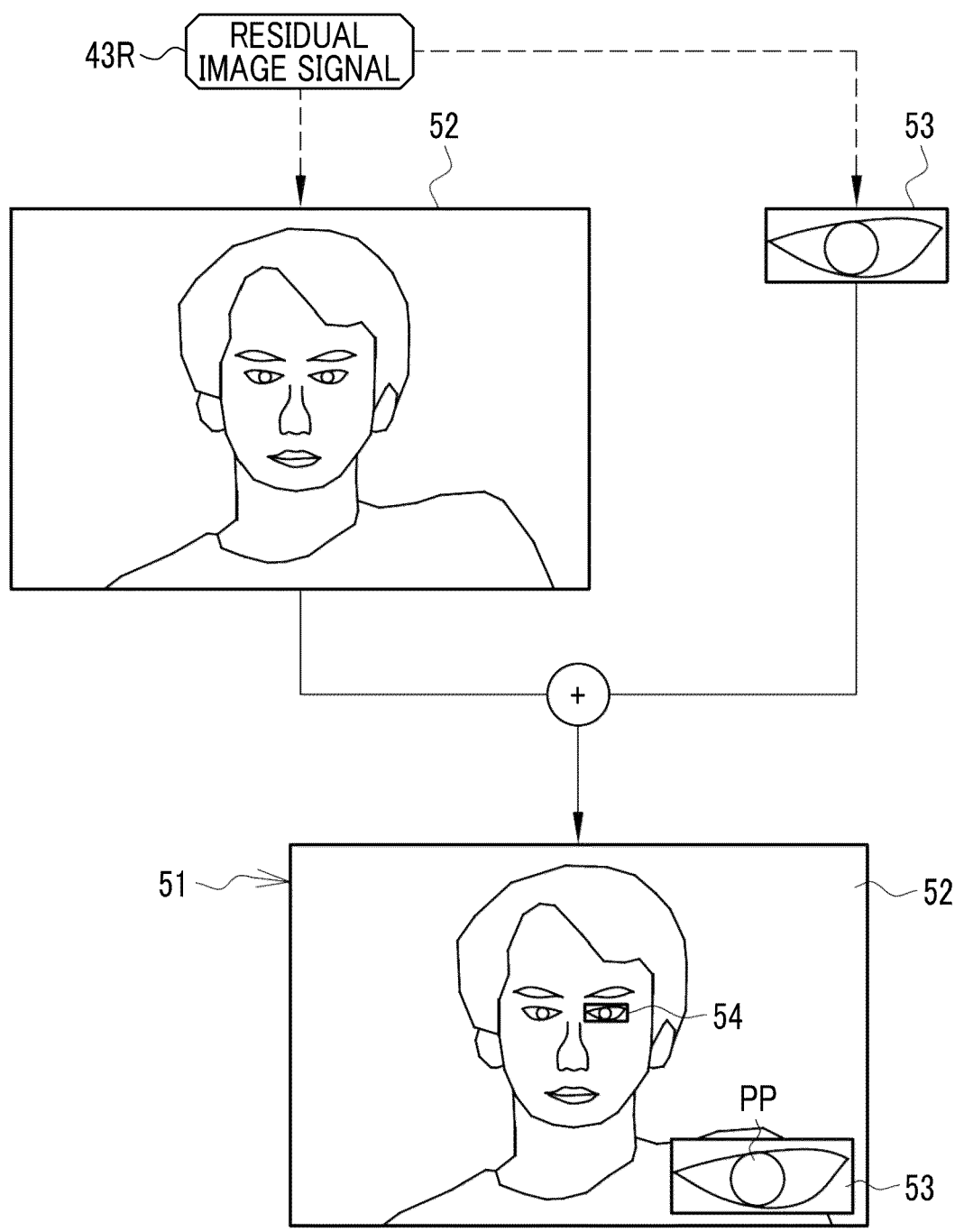
FIG. 20 is a diagram showing a method of generating the composite image while the video is captured.

In a case where the thinning out and reading out is performed while the video is captured, as shown in FIG. 20 as an example, the image processing unit 27 generates both the entire image 52 and the region image 53 from the residual image signal 43R. In this case, the image processing unit 27 performs the pixel interpolation processing to generate the entire image 52 and the region image 53 by interpolating the pixel value for the signal for detection 43D. The composite image 51 is generated from the entire image 52 and the region image 53.

As described above, in the second embodiment, as shown in FIG. 19, the imaging controller 70 causes the imaging element 12 to thin out and read out the signal for detection 43D while the video is captured. Therefore, it is possible to check whether or not the target region is in focus while the video is captured without significant hindrance even though the subject is in motion.

Further, as shown in FIG. 20, the image processing unit 27 generates at least the entire image 52 from the residual image signal 43R. Therefore, it is possible to generate the entire image 52 having good image quality as compared with a case where the entire image 52 is generated from the signal for detection 43D. With the entire image 52 having a relatively good image quality, it is easy to check the subject and thus it is suitable for a case of the video capturing. The entire image 52 may be generated from the signal for detection 43D, as in the first embodiment. Further, the region image 53 may be generated from the signal for detection 43D.

Third Embodiment

Figure 21:
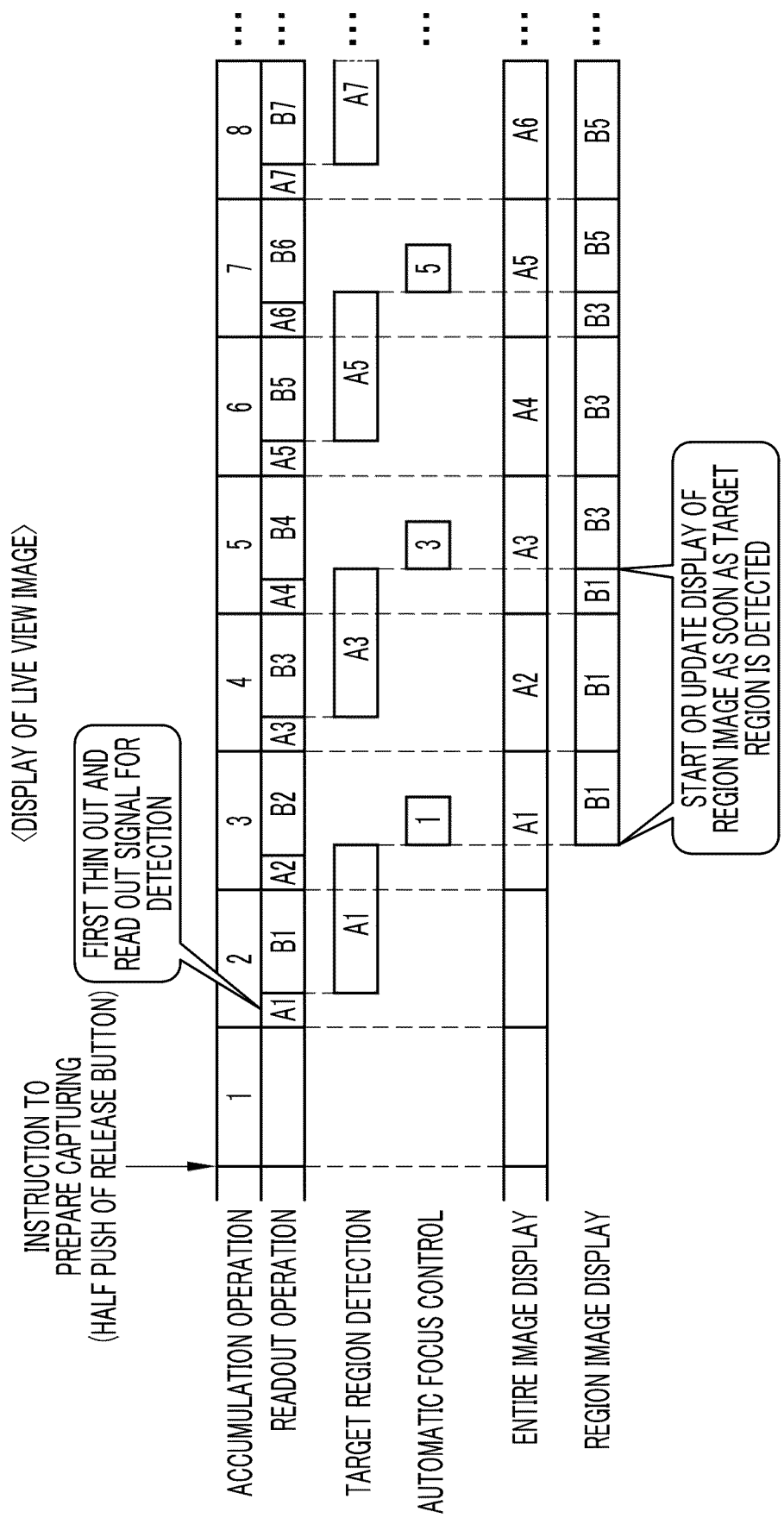
FIG. 21 is a diagram showing a flow of accumulation operation, readout operation, target region detection, automatic focus control, entire image display, and region image display, while a live view image is displayed, of a third embodiment.

In the first embodiment, the display update timings of the entire image 52 and the region image 53 are synchronized, but the present disclosure is not limited thereto. As shown in FIG. 21 as an example, the display controller 30 may start or update the display of the region image 53 as soon as the detection unit 71 detects the target region using the signal for detection 43D, without waiting for the display update timing of the entire image 52. Specifically, the display controller 30 starts to display the region image 53 generated from the residual image signal 43R read out by the readout operation B1 as soon as the detection of the target region based on the signal for detection 43D thinned out and read out by the readout operation A1 is ended. Further, as soon as the detection of the target region based on the signal for detection 43D thinned out and read out by the readout operation A3 is ended, the display of the region image 53 generated from the residual image signal 43R read out by the readout operation B3 is updated. The same applies hereinafter. With the control described above, in the display controller 30, the time lag from the end of the detection of the target region in the detection unit 71 to the start or update of the display of the region image 53 is set to be equal to or less than the time T1 of the first embodiment, more specifically, to zero. The time T1 is an example of "certain period" according to the technique of the present disclosure.

As described above, in the third embodiment, the display controller 30 may start or update the display of the region image 53 as soon as the detection unit 71 detects the target region using the signal for detection 43D, without waiting for the display update timing of the entire image 52. Accordingly, in the display controller 30, the time lag from the end of the detection of the target region in the detection unit 71 to the start or update of the display of the region image 53 is set to be equal to or less than a certain period. Therefore, it is possible to further suppress the display deviation of the region image 53 caused by the movement of the subject. However, in this case, the display update timings of the entire image 52 and the region image 53 are partially asynchronous.

Fourth Embodiment

Figure 22:
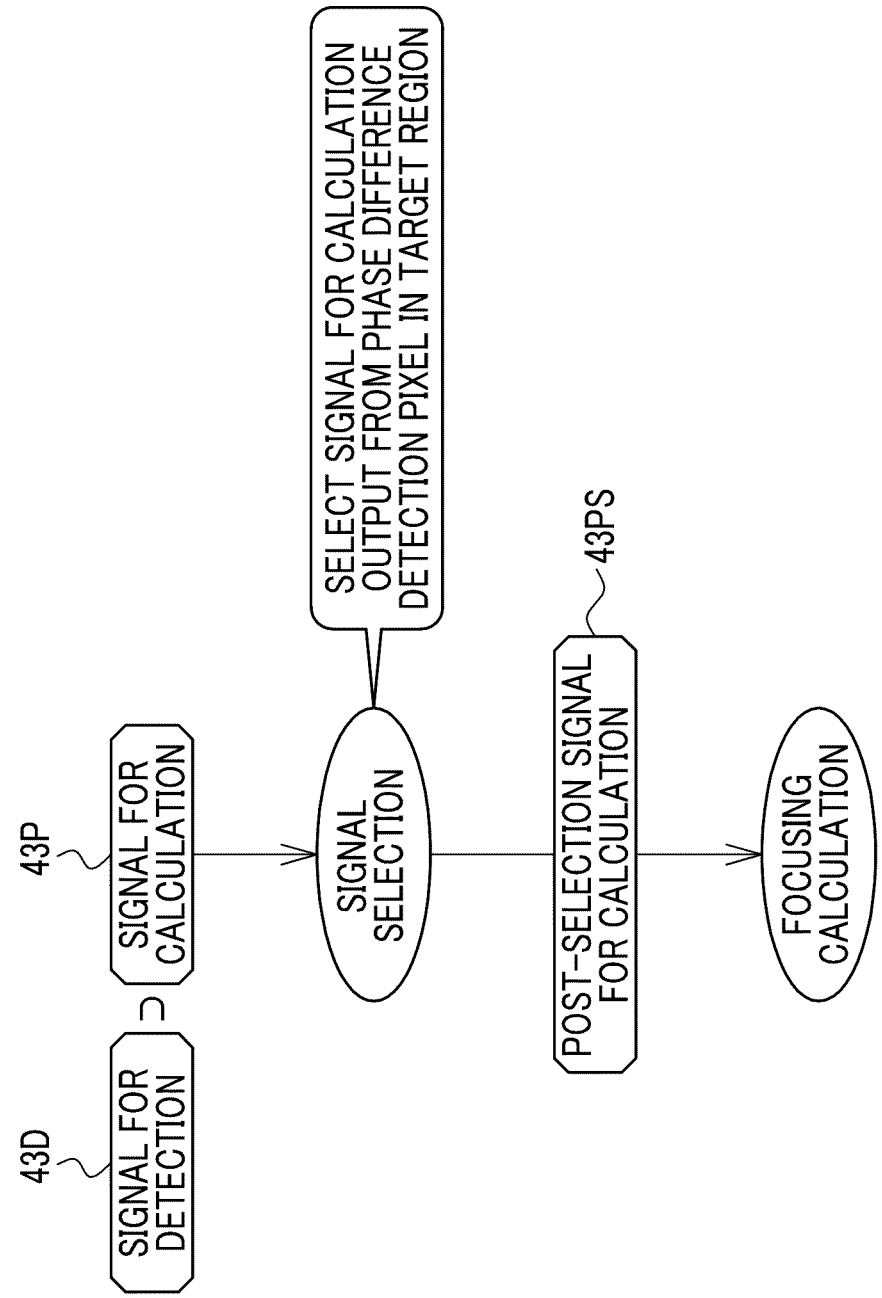
FIG. 22 is a diagram showing processing of the focusing calculation unit according to a fourth embodiment.

In the first embodiment, as shown in FIG. 15, the signal for calculation 43P, which is output from the phase difference detection pixel 41P in the target region, is selected among all the signals for calculation 43P read out in the readout operations A and B, but the present disclosure is not limited thereto. As shown in FIG. 22 as an example, the signal for calculation 43P output from the phase difference detection pixel 41P in the target region may be selected among the signals for calculation 43P in the signal for detection 43D read out in the readout operation A.

As described above, in the fourth embodiment, the focus adjustment unit 72 performs the automatic focus control using the signal for calculation 43P output from the phase difference detection pixel 41P in the target region, among the signals for calculation 43P in the signal for detection 43D. That is, the focus adjustment unit 72 performs the automatic focus control using the signal for detection 43D. Therefore, it is possible to maintain the accuracy of the automatic focus control without deviation between the target region detected by the signal for detection 43D and the target region on which the automatic focus control is actually performed.

Fifth Embodiment

Figure 23:
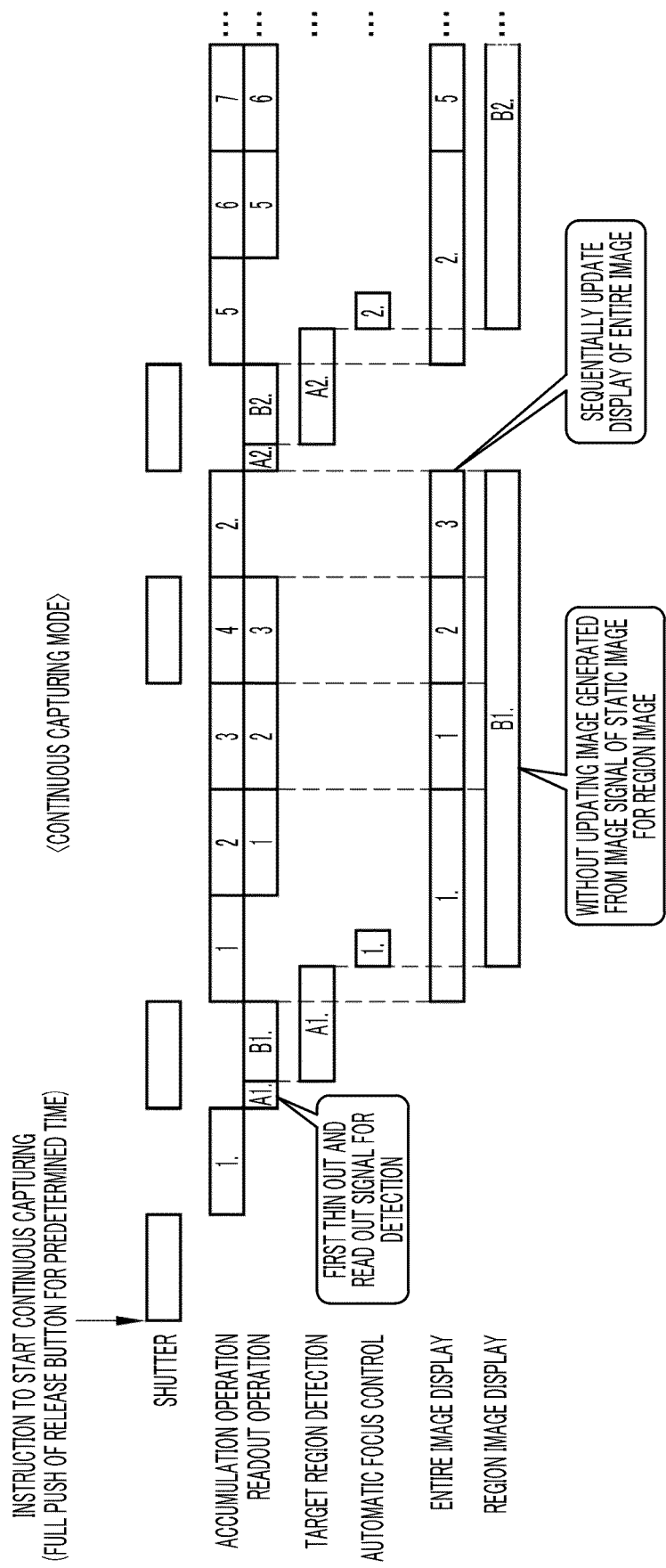
FIG. 23 is a diagram showing a flow of accumulation operation, readout operation, target region detection, automatic focus control, entire image display, and region image display, in a case of a continuous capturing mode.

As shown in FIG. 23 as an example, in a case where the release button is fully pushed for a predetermined time in the static-image capturing mode and the instruction receiving unit 32 receives an instruction to start continuous capturing, that is, in a case where the continuous capturing mode is activated, each of the processing units 70 to 72 of the CPU 56 performs the following processing. First, the imaging controller 70 thins out and reads out the signal for detection 43D (shown as readout operation A. in FIG. 23) at the beginning of the readout operation of the image signal 43 of the static images obtained by continuous capturing with opening and closing of the shutter 23. After the end of the thinning out and reading out, the residual image signal 43R of the static images obtained by continuous capturing is read out (shown as readout operation B. in FIG. 23). Further, the imaging controller 70 performs, in a period where two consecutive static images are captured, a normal readout operation of sequentially reading out the image signal 43 without thinning out and reading out the signal for detection 43D at the beginning of the readout operation. Even in the period where two consecutive static images are captured, the signal for detection 43D may be first thinned out and read out.

The detection unit 71 uses the signal for detection 43D obtained in the readout operation A. to detect the target region. The focus adjustment unit 72 performs, based on the signal for calculation 43P obtained in the readout operation A. and the readout operation B., the automatic focus control.

The image processing unit 27 generates the region image 53 from the residual image signal 43R of the static image obtained in the readout operation B . . . Further, the image processing unit 27 generates, in the period where two consecutive static images are captured, the entire image 52 from the image signal 43 obtained in the normal readout operation without the thinning out and reading out.

The display controller 30 performs, in the period where two consecutive static images are captured, control of sequentially updating the display of the entire image 52 and of displaying the region image 53 on the display unit together with the entire image 52 without updating only the image generated from the residual image signal 43R of the static image. As in the third embodiment, the display controller 30 may start or update the display of the region image 53 as soon as the detection unit 71 detects the target region using the signal for detection 43D, without waiting for the display update timing of the entire image 52. Since the generation of the entire image 52 is not in time immediately after the display of the region image 53, the static images obtained by continuous capturing are reproduced and displayed on the composite image 51 until the entire image 52 is generated.

As described above, in the fifth embodiment, in a case where the continuous capturing mode in which the static images are continuously captured at a capturing interval set in advance is activated, the imaging controller 70 thins out and reads out the signal for detection 43D at the beginning of the readout operation of the image signal 43 of the static image captured in the continuous capturing mode, and reads out the residual image signal 43R of the static image after the end of the thinning out and reading out. The image processing unit 27 generates the region image 53 from the image signal 43 (residual image signal 43R) of the static image. The display controller 30 performs, in the period where two consecutive static images are captured, control of updating the display of the entire image 52 and of displaying the region image 53 on the display unit together with the entire image 52 without updating only the image generated from the residual image signal 43R of the static image.

In the continuous capturing mode, it is sufficient to be able to check whether or not the target region of the static images obtained by continuous capturing is in focus. Thus, in the fifth embodiment, the region image 53 generated from the residual image signal 43R of the static image is displayed without updating. Therefore, it is possible to display the region image 53 that matches the circumstances peculiar to the continuous capturing mode. Further, it is possible to reduce a processing load required for updating the display of the region image 53.

The region image 53 may be generated from the signal for detection 43D obtained in the readout operation A., instead of the residual image signal 43R of the static image obtained in the readout operation B . . . Further, as in each of the embodiments described above, in a case where the continuous capturing mode is activated, in the period where two consecutive static images are captured, the readout operation of first thinning out and reading out the signal for detection 43D may be performed and the region image 53 may be displayed while being updated.

Modification Example

Figure 24:
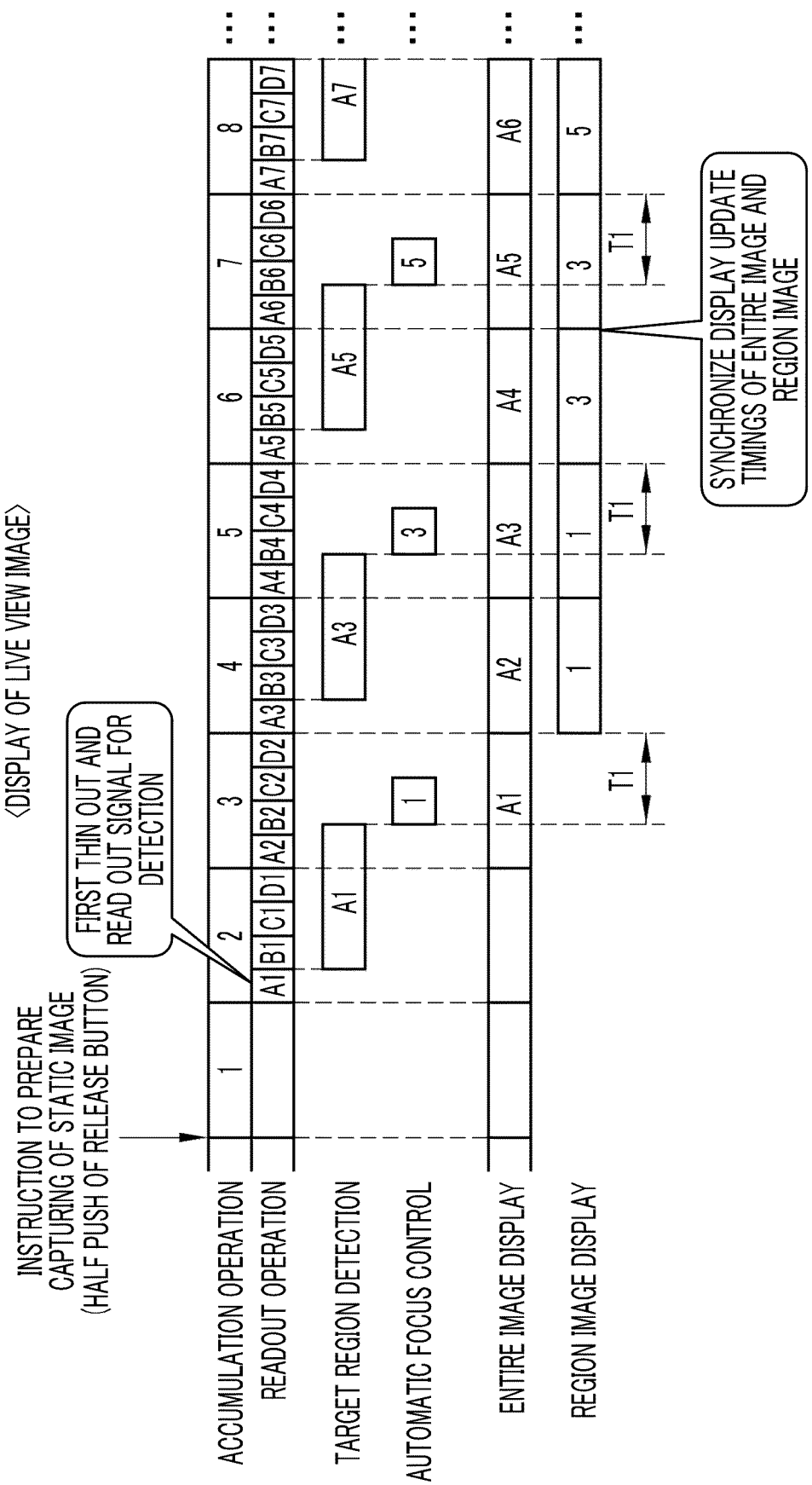
FIG. 24 is a diagram showing another example of a method of reading out the remaining image signal.

In each of the embodiments described above, the signal for detection 43D is thinned out and read out, and then the residual image signal 43R is read out at once. However, the present disclosure is not limited thereto. As shown in FIG. 24 as an example, the residual image signal 43R may be read out in three stages of a readout operation B, a readout operation C, and a readout operation D. The readout operation A of the signal for detection 43D is as shown in FIG. 11 of the first embodiment. The readout operation B of the residual image signal 43R is an operation of sequentially reading out the residual image signals 43R at a four-row spacing, such as the pixels 41 in a second row, the pixels 41 in a sixth row, the pixels 41 in a tenth row, and the like. Further, the readout operation C is an operation of sequentially reading out the residual image signals 43R also at a four-row spacing, such as the pixels 41 in a third row, the pixels 41 in a seventh row, the pixels 41 in an eleventh row, and the like. Furthermore, the readout operation D is an operation of sequentially reading out the residual image signals 43R also at a four-row spacing, such as the pixels 41 in a fourth row, the pixels 41 in an eighth row, the pixels 41 in a twelfth row, and the like. In this manner, the residual image signal 43R may also be thinned out and read out. In this case, the image processing unit 27 generates the entire image 52 from the signal for detection 43D obtained in the readout operation A. Further, the image processing unit 27 generates the region image 53 from all the image signals 43 that are a combination of the signal for detection 43D obtained in the readout operation A and the residual image signals 43R obtained in the readout operations B to D.

In each of the embodiments described above, the composite image 51 of the entire image 52 and the region image 53 is displayed on the display unit, but, the present disclosure is not limited thereto. Only the region image 53 may be displayed on the display unit without displaying the entire image 52.

In each of the embodiments described above, the so-called automatic focus control of phase difference detection type has been described as an example, but the present disclosure is not limited thereto. Instead of or in addition to the automatic focus control of phase difference detection type, an automatic focus control of contrast detection type may be employed. Further, an imaging element may be used in which one pixel 41 is configured of two photoelectric conversion elements 47 and one pixel 41 serves as the normal pixel 41N and the phase difference detection pixel 41P.

The imaging apparatus according to the technique of the present disclosure may be a compact digital camera, a smartphone, or a tablet terminal.

In each of the embodiments described above, for example, as a hardware structure of processing units that execute various types of processing, such as the image processing unit 27, the display controller 30, the instruction receiving unit 32, the imaging controller 70, the detection unit 71, the focus adjustment unit 72, the focusing calculation unit 73, and the focus lens driving controller 74, the following various processors may be used. The various processors include, for example, the CPU 56 which is a general-purpose processor executing software (operation program 65) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to perform specific processing.

One processing unit may be configured by one of the various types of processors or may be configured by a combination of two or more processors of the same type or different types (for example, a combination of a plurality of FPGAs and/or a combination of a CPU and an FPGA). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

More specifically, a circuitry combining circuit elements such as semiconductor elements may be used as the hardware structure of the various processors.

It is possible to understand the techniques described in the following supplementary notes from the above description.

Supplementary Note 1

An automatic focus control device comprising:

a processor, wherein the processor is configured to:

control a readout operation of an image signal from an imaging element;

detect a target region of automatic focus control;

perform the automatic focus control based on the target region; and in the readout operation, first thin out and read out a signal for detection which is an image signal for detecting the target region, and read out a remaining image signal after an end of the thinning out and reading out.

Supplementary Note 2

The automatic focus control device according to Supplementary Note 1, wherein the processor is configured to:

perform the automatic focus control using the signal for detection.

Supplementary Note 3

The automatic focus control device according to Supplementary Note 1 or 2, wherein the imaging element has a phase difference detection pixel for detecting a phase difference of subject light, and the processor is configured to:

perform the automatic focus control using a signal for calculation output from the phase difference detection pixel.

Supplementary Note 4

The automatic focus control device according to Supplementary Note 3, wherein the processor is configured to:

detect the target region from the signal for detection by using a machine learning model subjected to learning with an image output from an imaging element having a phase difference detection pixel.

Supplementary Note 5

An imaging apparatus comprising:

an imaging element;

an imaging controller that controls a readout operation of an image signal from the imaging element;

a detection unit that detects a target region of automatic focus control;

a focus adjustment unit that performs the automatic focus control based on the target region;

an image generation unit that generates an image of the target region from the image signal; and a display controller that performs control of displaying the image of the target region on a display unit, wherein the imaging controller first thins out and reads out, in the readout operation, a signal for detection which is an image signal for detecting the target region by the detection unit, and reads out a remaining image signal after an end of the thinning out and reading out.

Supplementary Note 6

The imaging apparatus according to Supplementary Note 5, wherein the display controller performs control of displaying the image of the target region on the display unit after the end of the thinning out and reading out and before an end of the reading out of the remaining image signal.

Supplementary Note 7

The imaging apparatus according to Supplementary Note 5 or 6, wherein the image generation unit generates an entire image of a subject from the image signal, and the display controller performs control of displaying the image of the target region and the entire image together on the display unit while updating the display.

Supplementary Note 8

The imaging apparatus according to Supplementary Note 7, wherein the imaging controller performs the thinning out and reading out while a live view image is displayed.

Supplementary Note 9

The imaging apparatus according to Supplementary Note 8, wherein the image generation unit generates at least the image of the target region from the remaining image signal.

Supplementary Note 10

The imaging apparatus according to any one of Supplementary Notes 7 to 9, wherein the imaging controller performs the thinning out and reading out while a video is captured.

Supplementary Note 11

The imaging apparatus according to Supplementary Note 10, wherein the image generation unit generates at least the entire image from the remaining image signal.

Supplementary Note 12

The imaging apparatus according to any one of Supplementary Notes 7 to 11, wherein the display controller synchronizes display update timings of the image of the target region and the entire image.

Supplementary Note 13

The imaging apparatus according to any one of Supplementary Notes 7 to 11, wherein the display controller starts or updates the display of the image of the target region as soon as the detection unit detects the target region using the signal for detection, without waiting for a display update timing of the entire image.

Supplementary Note 14

The imaging apparatus according to Supplementary Note 13, wherein the display controller sets a time lag from an end of the detection of the target region in the detection unit to the start or update of the display of the image of the target region to be equal to or less than a certain period.

Supplementary Note 15

The imaging apparatus according to any one of Supplementary Notes 7 to 14, wherein a continuous capturing mode in which a static image is continuously captured at a preset capturing interval is included, the imaging controller thins out and reads out the signal for detection at a beginning of a readout operation of an image signal of the static image captured in the continuous capturing mode, and reads out a remaining image signal of the static image after an end of the thinning out and reading out, the image generation unit generates the image of the target region from the image signal of the static image, and the display controller performs, in a period where two consecutive static images are captured, control of updating the display of the entire image and displaying the image of the target region on the display unit together with the entire image without updating only an image generated from the image signal of the static image.

Supplementary Note 16

The imaging apparatus according to any one of Supplementary Notes 5 to 15, wherein the focus adjustment unit performs the automatic focus control using the signal for detection.

Supplementary Note 17

The imaging apparatus according to any one of Supplementary Notes 5 to 16, wherein the imaging element has a phase difference detection pixel for detecting a phase difference of subject light, and the focus adjustment unit performs the automatic focus control using a signal for calculation output from the phase difference detection pixel.

Supplementary Note 18

The imaging apparatus according to Supplementary Note 17, wherein the detection unit detects the target region from the signal for detection by using a machine learning model subjected to learning with an image output from an imaging element having a phase difference detection pixel.

The above various embodiments and/or various modification examples can be combined as appropriate in the technique of the present disclosure. It is needless to say that the technique of the present disclosure is not limited to each of the embodiments described above and various configurations can be employed without departing from the gist. Further, the technique of the present disclosure extends to a storage medium that stores the program non-transitorily, in addition to the program.

The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. In order to avoid complication and facilitate understanding of the portion according to the technique of the present disclosure, the description related to common general knowledge not requiring special description in order to implement the technique of the present disclosure is omitted in the above description content and illustrated content.

In the present specification, "A and/or B" is synonymous with "at least one of A or B". That is, "A and/or B" means that only A may be used, only B may be used, or a combination of A and B may be used. In the present specification, the same concept as "A and/or B" is also applied to a case where three or more matters are linked and expressed by "and/or".

All documents, patent applications, and technical standards described in the present specification are incorporated by reference in the present specification to the same extent as in a case where the incorporation of each individual document, patent application, and technical standard by reference is specifically and individually described.

What is claimed is:

1. An automatic focus control device comprising:
a processor,
wherein the processor is configured to:
control a readout operation of an image signal from an imaging element;
detect a target region of automatic focus control;
perform the automatic focus control based on the target region; and
in the readout operation, first thin out and read out a signal for detection which is an image signal for detecting the target region, and read out a remaining image signal after an end of the thinning out and reading out.

2. The automatic focus control device according to claim 1,
wherein the processor is configured to:
perform the automatic focus control using the signal for detection.

3. The automatic focus control device according to claim 1,
wherein the imaging element has a phase difference detection pixel for detecting a phase difference of subject light, and
the processor is configured to:
perform the automatic focus control using a signal for calculation output from the phase difference detection pixel.

4. The automatic focus control device according to claim 3,
wherein the processor is configured to:
detect the target region from the signal for detection using a machine learning model subjected to learning with an image output from an imaging element having a phase difference detection pixel.

5. An operation method of an automatic focus control device comprising:
controlling a readout operation of an image signal from an imaging element;
detecting a target region of automatic focus control;
performing the automatic focus control based on the target region; and
in the readout operation, first thinning out and reading out a signal for detection which is an image signal for detecting the target region, and reading out a remaining image signal after an end of the thinning out and reading out.

6. A non-transitory computer-readable storage medium storing an operation program of an automatic focus control device causing a computer to execute a process comprising:
controlling a readout operation of an image signal from an imaging element;
detecting a target region of automatic focus control;
performing the automatic focus control based on the target region; and
in the readout operation, first thinning out and reading out a signal for detection which is an image signal for detecting the target region, and reading out a remaining image signal after an end of the thinning out and reading out.

7. An imaging apparatus comprising:
an imaging element; and
at least one processor configured to:
control a readout operation of an image signal from the imaging element;
detect a target region of automatic focus control;
perform the automatic focus control based on the target region;
generate an image of the target region from the image signal; and
perform control of displaying the image of the target region on a display unit,
wherein the at least one processor first thins out and reads out, in the readout operation, a signal for detection which is an image signal for detecting the target region, and reads out a remaining image signal after an end of the thinning out and reading out.

8. The imaging apparatus according to claim 7,
wherein the at least one processor performs control of displaying the image of the target region on the display unit after the end of the thinning out and reading out and before an end of the reading out of the remaining image signal.

9. The imaging apparatus according to claim 7,
wherein the at least one processor generates an entire image of a subject from the image signal, and
the at least one processor performs control of displaying the image of the target region and the entire image together on the display unit while updating the display.

10. The imaging apparatus according to claim 9,
wherein the at least one processor performs the thinning out and reading out while a live view image is displayed.

11. The imaging apparatus according to claim 10,
wherein the at least one processor generates at least the image of the target region from the remaining image signal.

12. The imaging apparatus according to claim 9,
wherein the at least one processor performs the thinning out and reading out while a video is captured.

13. The imaging apparatus according to claim 12,
wherein the at least one processor generates at least the entire image from the remaining image signal.

14. The imaging apparatus according to claim 9,
wherein the at least one processor synchronizes display update timings of the image of the target region and the entire image.

15. The imaging apparatus according to claim 9,
wherein the at least one processor starts or updates the display of the image of the target region as soon as the target region is detected using the signal for detection, without waiting for a display update timing of the entire image.

16. The imaging apparatus according to claim 15,
wherein the at least one processor sets a time lag from an end of the detection of the target region to the start or update of the display of the image of the target region to be equal to or less than a certain period.

17. The imaging apparatus according to claim 9,
wherein a continuous capturing mode in which a static image is continuously captured at a preset capturing interval is included,
the at least one processor thins out and reads out the signal for detection at a beginning of a readout operation of an image signal of the static image captured in the continuous capturing mode, and reads out a remaining image signal of the static image after an end of the thinning out and reading out,
the at least one processor generates the image of the target region from the image signal of the static image, and
the at least one processor performs, in a period where two consecutive static images are captured, control of updating the display of the entire image and displaying the image of the target region on the display unit together with the entire image without updating only an image generated from the image signal of the static image.

18. The imaging apparatus according to claim 7,
wherein the at least one processor performs the automatic focus control using the signal for detection.

19. The imaging apparatus according to claim 7,
wherein the imaging element has a phase difference detection pixel for detecting a phase difference of subject light, and
the at least one processor performs the automatic focus control using a signal for calculation output from the phase difference detection pixel.

20. The imaging apparatus according to claim 19,
wherein the at least one processor detects the target region from the signal for detection by using a machine learning model subjected to learning with an image output from an imaging element having a phase difference detection pixel.

* * * * *